(12) United States Patent
Uchibe et al.

(10) Patent No.: US 10,896,383 B2
(45) Date of Patent: Jan. 19, 2021

(54) DIRECT INVERSE REINFORCEMENT LEARNING WITH DENSITY RATIO ESTIMATION

(71) Applicant: Okinawa Institute of Science and Technology School Corporation, Okinawa (JP)

(72) Inventors: Eiji Uchibe, Okinawa (JP); Kenji Doya, Okinawa (JP)

(73) Assignee: OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 963 days.

(21) Appl. No.: 15/425,924

(22) Filed: Feb. 6, 2017

(65) Prior Publication Data

US 2017/0147949 A1   May 25, 2017

Related U.S. Application Data

(63) Continuation-in-part of application No. 15/329,690, filed as application No. PCT/JP2015/004001 on Aug. 7, 2015.

(Continued)

(51) Int. Cl.
  *G06N 20/00*   (2019.01)
  *G06N 7/00*   (2006.01)
  *G06K 9/62*   (2006.01)

(52) U.S. Cl.
  CPC .......... *G06N 20/00* (2019.01); *G06K 9/6297* (2013.01); *G06N 7/005* (2013.01)

(58) Field of Classification Search
  CPC .................. G06N 20/00; G06N 7/005
  See application file for complete search history.

(56) References Cited

U.S. PATENT DOCUMENTS

| 7,672,739 B2 | 3/2010 | Ganesan et al. |
| 8,478,642 B2 | 7/2013 | Dey et al. |

(Continued)

FOREIGN PATENT DOCUMENTS

| JP | 5815458 B2 | 11/2015 |
| WO | 2016/021210 A1 | 2/2016 |

OTHER PUBLICATIONS

Office Action dated Aug. 24, 2018, issued in counterpart Chinese Application No. 201580042022.7, with English translation. (9 pages).

(Continued)

*Primary Examiner* — Austin Hicks
(74) *Attorney, Agent, or Firm* — Westerman, Hattori, Daniels & Adrian, LLP

(57) ABSTRACT

A method of inverse reinforcement learning for estimating reward and value functions of behaviors of a subject includes: acquiring data representing changes in state variables that define the behaviors of the subject; applying a modified Bellman equation given by Eq. (1) to the acquired data:

$$r(x) + \gamma V(y) - V(x) = \ln\frac{\pi(y|x)}{b(y|x)}, \quad (1)$$

$$= \ln\frac{\pi(x,y)}{b(x,y)} - \ln\frac{\pi(x)}{b(x)}, \quad (2)$$

where r(x) and V(x) denote a reward function and a value function, respectively, at state x, and γ represents a discount factor, and b(y|x) and π(y|x) denote state transition probabilities before and after learning, respectively; estimating a logarithm of the density ratio π(x)/b(x) in Eq. (2); estimating (Continued)

r(x) and V(x) in Eq. (2) from the result of estimating a log of the density ratio $\pi(x,y)/b(x,y)$; and outputting the estimated r(x) and V(x).

7 Claims, 15 Drawing Sheets

Related U.S. Application Data

(60) Provisional application No. 62/308,722, filed on Mar. 15, 2016, provisional application No. 62/034,510, filed on Aug. 7, 2014.

(56) References Cited

U.S. PATENT DOCUMENTS

| | | |
|---|---|---|
| 8,756,177 B1 | 6/2014 | Margineantu et al. |
| 2009/0299496 A1 | 12/2009 | Cade |
| 2014/0018985 A1 | 1/2014 | Gupta et al. |

OTHER PUBLICATIONS

Abbeel, P. and Ng, A.Y., "Apprenticeship Learning via Inverse Reinforcement Learning", In Proc. of the 21st International Conference on Machine Learning, Jul. 4-8, 2004. (Mentioned in paragraph Nos. 2-3, 5, and 7 of the as-filed specification.).
Aghasadeghi, N. and Bretl, T., "Maximum entropy inverse reinforcement learning in continuous state spaces with path integrals", In Proc. of IEEE/RSJ International Conference on Intelligent Robots and Systems, pp. 1561-1566, Sep. 25-30, 2011. (Mentioned in paragraph Nos. 6-7 of the as-filed specification.).
Boularias, A., Kober, J., and Peters, J., "Relative entropy inverse reinforcement learning", In Proc. of the 14th International Conference on Artificial Intelligence and Statistics, vol. 15, Apr. 11-13, 2011, pp. 182-189 (Mentioned in paragraph No. 7 of the as-filed specification.).
Deisenroth, M.P., Rasmussen, C.E, and Peters, J., "Gaussian process dynamic programming", Neurocomputing 72 (7-9):1508-1524, 2009. (Mentioned in paragraph Nos. 7 and 36-37 of the as-filed specification.).
Doya, K., "Reinforcement learning in continuous time and space", Neural Computation, 12(1):219-245, pp. 1-29, 2000. (Mentioned in paragraph Nos. 7 and 36 of the as-filed specification.).
Dvijotham, K. and Todorov, E., "Inverse Optimal Control with Linearly-Solvable MDPs", In Proc. of the 27th International Conference on Machine Learning, 2010. (Mentioned in paragraph Nos. 3, 6-7, 8, 21, and 24 of the as-filed specification.).
Fleming, W.H. and Soner, H.M. ,"Controlled Markov Processes and Viscosity Solutions", Springer, Second Edition, 2006. (Mentioned in paragraph Nos. 6-7of the as-filed specification.).
Kalakrishnan, M., Pastor, P., Righetti, L., and Schaal, S., "Learning Objective Functions for Manipulation", In Proc. of IEEE International Conference on Robotics and Automation, pp. 1331-1336, 2013. (Mentioned in paragraph Nos. 6-7 of the as-filed specification.).
Kanamori, T., Hido, S., and Sugiyama, M., "A Least-squares Approach to Direct Importance Estimation", Journal of Machine Learning Research, 10:1391-1445, 2009. (Mentioned in paragraph Nos. 7, 29, and 32 of the as-filed specification.).
Kappen, H.J., Gomez, V., and Opper, M., "Optimal control as a graphical model inference problem", Machine Learning, 87(2)159-182, May 2012. (Mentioned in paragraph Nos. 6-7 of the as-filed specification.).
Kinjo, K., Uchibe, E., and Doya, K., "Evaluation of linearly solvable Markov decision process with dynamic model learning in a mobile robot navigation task", Frontiers in Neurorobotics, 7(7), 2013. (Mentioned in paragraph Nos. 7 and 51 of the as-filed specification.).
Levine, S. and Koltun, V., "Continuous Inverse Optimal Control with Locally Optimal Examples", In Proc. of the 27th International Conference on Machine Learning, 2012. (Mentioned in paragraph No. 7 of the as-filed specification.).
Levine, S., Popovic, Z., and Koltun, V., "Nonlinear Inverse Reinforcement Learning with Gaussian Processes," Advances in Neural Information Processing Systems 24, pp. 19-27. 2011. (Mentioned in paragraph No. 7 of the as-filed specification.).
Ng, A.Y. and Russell, S., "Algorithms for Inverse Reinforcement Learning", In Proc. of the 17th International conference on Machine Learning, Jun. 29-Jul. 2, 2000. (Mentioned in paragraph Nos. 3, 5, and 7-8 of the as-filed specification.).
Rasmussen, C.E. and Williams, C. K.I., "Gaussian Processes for Machine Learning", MIT Press, 2006. (Mentioned in paragraph Nos. 7 and 28 of the as-filed specification.).
Ratliff, N.D., Silver, D, and Bagnell, J.A., "Learning to search: Functional gradient techniques for imitation learning", Autonomous Robots, 27(1): 25-53, 2009. (Mentioned in paragraph Nos. 5 and 7 of the as-filed specification.).
Stulp, F. and Sigaud, O., "Path Integral Policy Improvement with Covariance Matrix Adaptation", In Proc. of the 10th European Workshop on Reinforcement Learning, 2012. (Mentioned in paragraph Nos. 7 and 51 of the as-filed specification.).
Sugimoto, N. and Morimoto, J., "Phase-dependent trajectory optimization for periodic movement using path integral reinforcement learning", In Proc. of the 21st Annual Conference of the Japanese Neural Network Society, Dec. 2011. (Mentioned in paragraph Nos. 7 and 51 of the as-filed specification.).
Sugiyama, M., Takeuchi, I., Suzuki, T., Kanamori, T., Hachiya, H., and Okanohara, D., Least-Squares Conditional Density Estimation. IEICE Transactions on Information and Systems, E93-D(3): 583-594, Mar. 2010. (Mentioned in paragraph Nos. 7 and 33 of the as-filed specification.).
Sugiyama, M., Suzuki, T., and Kanamori, T., "Density Ratio Estimation in Machine Learning", Cambridge University Press, 2012. (Mentioned in paragraph Nos. 7 and 26 of the as-filed specification.).
Theodorou, E., Buchli, J., and Schaal, S., "A Generalized Path Integral Control Approach to Reinforcement Learning", Journal of Machine Learning Research, 11: 3137-3181, 2010. (Mentioned in paragraph Nos. 6-7 and 51 of the as-filed specification.).
Theodorou, E.A and Todorov, E., "Relative Entropy and Free Energy Dualities: Connections to Path Integral and KL control", In Proc. of the 51st IEEE Conference on Decision and Control, pp. 1466-1473, 2012. (Mentioned in paragraph Nos. 7 and 51 of the as-filed specification.).
Todorov, E., "Linearly-solvable Markov decision problems", Advances in Neural Information Processing Systems 19, pp. 1369-1376, MIT Press, 2007. (Mentioned in paragraph Nos. 6-7 and 20 of the as-filed specification.).
Todorov, E., "Efficient computation of optimal actions", Proceedings of the National Academy of Sciences of the United States of America, 106(28): 11478-83, Jul. 14, 2009. (Mentioned in paragraph Nos. 6-7, 20, and 51 of the as-filed specification.).
Todorov, E., "Eigenfunction approximation methods for linearly-solvable optimal control problems", In Proc. of the 2nd IEEE Symposium on Adaptive Dynamic Programming and Reinforcement Learning, pp. 161-168, 2009. (Mentioned in paragraph Nos. 7, 20, and 40 of the as-filed specification.).
Ziebart, B.D., Maas, A., Bagnell, J.A., and Dey, A.K., "Maximum Entropy Inverse Reinforcement Learning", In Proc. of the 23rd AAAI Conference on Artificial Intelligence, pp. 1433-1438, 2008. (Mentioned in paragraph Nos. 5 and 7 of the as-filed specification.).
International Search Report (ISR) issued in PCT/JP2015/004001 dated Nov. 2015.
Written Opinion (PCT/ISA/237) issued in PCT/JP2015/004001 dated Nov. 2015.
Dvijotham et al., "Inverse Optimal Control with Linearly-Solvable MDPs", 2010, retrieved from the Internet: <URL: http://homes.cs.washington.edu/~todorov/papers/DvijothamICML10.pdf>.
Sugiyama et al., "A Density-ratio Framework for Statistical Data Processing", IPSJ Transactions on Computer Vision and Applications, (Sep. 2009) vol. 1, pp. 183-208 (Cited in the ISR above.).

(56) References Cited

OTHER PUBLICATIONS

Ziebart et al., "Maximum Entropy Inverse Reinforcement Learning", Proceedings of the 23rd AAAI Conference on Artificial Intelligence, 2008, pp. 1433-1438.
Fischer, "Inverse Reinforcement Learning", <URL: http://www.ausy.informatik.tu-darmstadt.de/uploads/Teaching/AutonomousLearningSystems/Fischer_ALS_2012.pdf>, 2012, pp. 1-10.
Ramachandran et al., "Bayesian Inverse Reinforcement Learning", Int. Joint Conference on AI, 2007, pp. 2586-2591.
Neu et al., "Apprenticeship Learning using Inverse Reinforcement Learning and Gradient Methods", UAI Conference, 2007, pp. 295-302 (Mentioned in paragraph No. 7 of the as-filed specification.).
Lopes et al., "Active Learning for Reward Estimation in Inverse Reinforcement Learning", Machine Learning and Knowledge Discovery in Databases, Springer Berlin Heidelberg, 2009, vol. 5782 of the series Lecture Notes in Computer Science, pp. 31-46.
Boularias et al., "Relative Entropy Inverse Reinforcement Learning", Proc. 14th Int. Conf. on AI and Statistics, 2011, UMLR Workshop and Conference Proceedings vol. 15, pp. 182-189.
Choi et al., "Inverse Reinforcement Learning in Partially Observable Environments", Journal of Machine Learning Research 12, 2011, pp. 691-730 (Mentioned in paragraph No. 7 of the as-filed specification.).
Michini, "Bayesian Nonparametric Reward Learning from Demonstration", Massachusetts Institute of Technology, Aug. 2013.
Mori et al., "Model-Free Apprenticeship Learning for Transfer of Human Impedance Behaviour", 11th IEEE-RAS International Conference on Humanoid Robots, Oct. 26-28, 2011.
Kolter et al., "Regularization and Feature Selection in Least-Squares Temporal Difference Learning", ICML '09 Proceedings of the 26th Annual International Conference on Machine Learning, Jun. 14-18, 2009, pp. 521-528.
Lagoudakis et al., "Least-Squares Policy Iteration", Journal of Machine Learning Research 4, 2003, pp. 1107-1149.
Bradtke et al., "Linear Least-Squares Algorithms for Temporal Difference Learning", Machine Learning, 1996, 22, pp. 33-57.
Jung et al., "Least Squares SVM for Least Squares TD Learning", European Conference on AI, 2006, pp. 499-503.
Butz et al., "Function Approximation with XCS: Hyperellipsoidal Conditions, Recursive Least Squares, and Compaction", IEEE Transactions on Evolutionary Computation, vol. 12, Issue: 3, Jun. 2008, pp. 1-33.
Aghasadeghi et al., "Inverse Optimal Control for a Hybrid Dynamical System with Impacts", 2012 IEEE International Conference on Robotics and Automation, May 14-18, 2012, pp. 4962-4967.
Vroman, M., "Maximum likelihood inverse reinforcement learning", PhD Thesis, Rutgers University, 2014. (Mentioned in paragraph No. 7 of the as-filed specification.).
Raita, H., "On the performance of maximum likelihood inverse reinforcement learning", arXiv preprint, 2012. (Mentioned in paragraph No. 7 of the as-filed specification.).
Choi, J. and Kim, K., "Nonparametric Bayesian inverse reinforcement learning for multiple reward functions", NIPS 25, 2012. (Mentioned in paragraph No. 7 of the as-filed specification.).
Mahadevan, S., "Proto-value functions: developmental reinforcement learning", In Proc. of the 22nd ICML, 2005. (Mentioned in paragraph No. 7 of the as-filed specification.).
PCT International Application No. PCT/JP2017/004463.
Communication pursuant to Article 94(3) EPC dated Jun. 12, 2019, issued in counterpart EP Application No. 15 829 111.2 (5 pages).
Taghipour, Nima et al., "Usage-Based Web Recommendations: A Reinforcement Learning Approach", Recommender Systems, Jan. 1, 2007, 8 pages; Cited in EP Communication dated Jun. 12, 2019 and Extended EP Search Report dated Mar. 7, 2018.
Office Action dated Apr. 17, 2018, issued in counterpart JP Application No. 2017-504116, with English translation (5 pages).
Extended Search Report dated Mar. 7, 2018, issued in counterpart EP Application No. 15829111.2 (11 pages).
Shani, Guy et al., "An MDP-Based Recommender System", Journal of Machine Learning Research 6, Jan. 1, 2005, pp. 1265-1295; Cited in Extended EP Search Report dated Mar. 7, 2018.
Uchibe, Eiji et al., "Inverse Reinforcement Learning Using Dynamic Policy Programming", International Conference on Development and Learning and Epigenetic Robotics, Oct. 13, 2014, pp. 222-228; Cited in Extended EP Search Report dated Mar. 7, 2018.
Extended (Supplementary) European Search Report dated Oct. 11, 2019, issued in counterpart EP application No. 17766134.5. (10 pages).
Uchibe Eiji et al., "Deep Inverse Reinforcement Learning by Logistic Regression", International Conference on Computer Analysis of Images and Patterns, Sep. 29, 2016, pp. 23-31, Cited in Extended European Search Report dated Oct. 11, 2019. (9 pages).
Doya, Kenji, "Temporal Difference Learning in Continuous Time and Space", Advances in Neural Information Processing Systems 8(NIPS), 1995, pp. 1073-1079, cited in Non Final Office Action dated Dec. 4, 2019. (7 pages).
Non-Final Office Action dated Dec. 4, 2019, issued in U.S. Appl. No. 15/329,690. (32 pages).
Office Action dated Sep. 11, 2020, issued in counterpart EP application No. 15829111.2. (7 pages).
Office Action dated Dec. 3, 2020 issued in counterpart EP Application No. 17766134.5 (6 pages).

FIG. 10

Second Density Ratio Estimation in Embodiment 2

- $\log \pi(x,y)/b(x,y)$ is estimated with the simplified Bellman equation:

$$\underbrace{\log \frac{\pi(x)}{b(x)} + q(x) + \gamma V(y)}_{\text{estimated by the first density ratio estimation}} \underbrace{- V(x)}_{\substack{q \text{ and } V \text{ are directly estimated} \\ \text{by the second density ratio} \\ \text{estimation}}}$$

- Note $q$ and $V$ are the function of state. We can reduce the number of parameters of approximators.

FIG. 13

DIRECT INVERSE REINFORCEMENT LEARNING WITH DENSITY RATIO ESTIMATION

TECHNICAL FIELD

The present invention relates to inverse reinforcement learning, and more particularly, to system and method of inverse reinforcement learning.

BACKGROUND ART

Understanding behaviors of human from observation is very crucial for developing artificial systems that can interact with human beings. Since our decision making processes are influenced by rewards/costs associated with selected actions, the problem can be formulated as an estimation of the rewards/costs from observed behaviors.

The idea of inverse reinforcement learning is originally proposed by Ng and Russel (2000) (NPL 14). The OptV algorithm proposed by Dvijotham and Todorov (2010) (NPL 6) is a prior work and they show that the policy of the demonstrator is approximated by the value function, which is a solution of the linearized Bellman equation.

Generally speaking, Reinforcement Learning (RL) is a computational framework for investigating decision-making processes of both biological and artificial systems that can learn an optimal policy by interacting with an environment. There exist several open questions in RL, and one of the critical problems is how to design and prepare an appropriate reward/cost function. It is easy to design a sparse reward function, which gives a positive reward when the task is accomplished and zero otherwise, but that makes it hard to find an optimal policy.

In some situations, it is easier to prepare examples of a desired behavior than to handcraft an appropriate reward/cost function. Recently, several methods of Inverse Reinforcement Learning (IRL) (Ng & Russell, 2000, NPL 14) and apprenticeship learning (Abbeel & Ng, 2004, NPL 1) have been proposed in order to derive a reward/cost function from demonstrator's performance and to implement imitation learning. However, most of the existing studies (Abbeel & Ng, 2004, NPL 1; Ratliff et al., 2009, NPL 16; Ziebart et al., 2008, NPL 26) require a routine to solve forward reinforcement learning problems with estimated reward/cost functions. This process is usually very time-consuming even when the model of the environment is available.

Recently, the concept of Linearly solvable Markov Decision Process (LMDP) (Todorov, 2007; 2009, NPLs 23-24) is introduced, which is a sub-class of Markov Decision Process by restricting the form of the cost function. This restriction plays an important role in IRL. LMDP is also known as KL-control and path-integral approaches (Kappen et al., 2012, NPL 10; Theodorou et al., 2010, NPL 21) and similar ideas are proposed in the field of control theory (Fleming and Soner, 2006, NPL 7). Model-free IRL algorithms based on the path-integral method are proposed by Aghasadeghi & Bretl (2011) (NPL 2); Kalakrishnan et al. (2013) (NPL 8). Since the likelihood of the optimal trajectory is parameterized by the cost function, the parameters of the cost can be optimized by maximizing likelihood. However, their methods require the entire trajectory data. A model-based IRL method is proposed by Dvijotham and Todorov (2010) (NPL 6) based on the framework of LMDP, in which the likelihood of the optimal state transition is represented by the value function. As opposed to path-integral approaches of IRL, it can be optimized from any dataset of state transitions. A major drawback is to evaluate the integral which cannot be solved analytically. In practice, they discretized the state space to replace the integral with a sum, but it is not feasible in high-dimensional continuous problems.

CITATION LIST

Non Patent Literature

[NPL 1]
Abbeel, P. and Ng, A. Y. Apprenticeship learning via inverse reinforcement learning. In *Proc. of the 21st International Conference on Machine Learning*, 2004.

[NPL 2]
Aghasadeghi, N. and Bretl, T. Maximum entropy inverse reinforcement learning in continuous state spaces with path integrals. In *Proc. of IEEE/RSJ International Conference on Intelligent Robots and Systems*, pp. 1561-1566, 2011.

[NPL 3]
Boularias, A., Kober, J., and Peters, J. Relative entropy inverse reinforcement learning. In *Proc. of the 14th International Conference on Artificial Intelligence and Statistics*, volume 15, 2011.

[NPL 4]
Deisenroth, M. P., Rasmussen, C. E, and Peters, J. Gaussian process dynamic programming. *Neurocomputing*, 72(7-9):1508-1524, 2009.

[NPL 5]
Doya, K. Reinforcement learning in continuous time and space. *Neural Computation*, 12:219-245, 2000.

[NPL 6]
Dvijotham, K. and Todorov, E. Inverse optimal control with linearly solvable MDPs. In *Proc. of the 27th International Conference on Machine Learning*, 2010.

[NPL 7]
Fleming, W. H. and Soner, H. M. *Controlled Markov Processes and Viscosity Solutions*. Springer, second edition, 2006.

[NPL 8]
Kalakrishnan, M., Pastor, P., Righetti, L., and Schaal, S. Learning objective functions for manipulation. In *Proc. of IEEE International Conference on Robotics and Automation*, pp. 1331-1336, 2013.

[NPL 9]
Kanamori, T., Hido, S., and Sugiyama, M. A Least-squares Approach to Direct Importance Estimation. *Journal of Machine Learning Research*, 10:1391-1445, 2009.

[NPL 10]
Kappen, H. J., Gómez, V., and Opper, M. Optimal control as a graphical model inference problem. *Machine Learning*, 87(2):159-182, 2012.

[NPL 11]
Kinjo, K., Uchibe, E., and Doya, K. Evaluation of linearly solvable Markov decision process with dynamic model learning in a mobile robot navigation task. *Frontiers in Neurorobotics*, 7(7), 2013.

[NPL 12]
Levine, S. and Koltun, V. Continuous inverse optimal control with locally optimal examples. In *Proc. of the 27th International Conference on Machine Learning*, 2012.

[NPL 13]
Levine, S., Popović, Z., and Koltun, V. Nonlinear inverse reinforcement learning with Gaussian processes. *Advances in Neural Information Processing Systems* 24, pp. 19-27. 2011.

[NPL 14]
Ng, A. Y. and Russell, S. Algorithms for inverse reinforcement learning. In *Proc. of the 17th International Conference on Machine Learning*, 2000.
[NPL 15]
Rasmussen, C. E. and Williams, C. K. I. *Gaussian Processes for Machine Learning*. MIT Press, 2006.
[NPL 16]
Ratliff, N. D., Silver, D, and Bagnell, J. A. Learning to search: Functional gradient techniques for imitation learning. *Autonomous Robots*, 27(1): 25-53, 2009.
[NPL 17]
Stulp, F. and Sigaud, O. Path integral policy improvement with covariance matrix adaptation. In *Proc. of the 10th European Workshop on Reinforcement Learning*, 2012.
[NPL 18]
Sugimoto, N. and Morimoto, J. Phase-dependent trajectory optimization for periodic movement using path integral reinforcement learning. In *Proc. of the 21st Annual Conference of the Japanese Neural Network Society*, 2011.
[NPL 19]
Sugiyama, M., Takeuchi, I., Suzuki, T., Kanamori, T., Hachiya, H., and Okanohara, D. Least-squares conditional density estimation. *IEICE Transactions on Information and Systems*, E93-D(3): 583-594, 2010.
[NPL 20]
Sugiyama, M., Suzuki, T., and Kanamori, T. *Density ratio estimation in machine learning*. Cambridge University Press, 2012.
[NPL 21]
Theodorou, E., Buchli, J., and Schaal, S. A generalized path integral control approach to reinforcement learning. *Journal of Machine Learning Research*, 11: 3137-3181, 2010.
[NPL 22]
Theodorou, E. A and Todorov, E. Relative entropy and free energy dualities: Connections to path integral and KL control. In *Proc. of the 51st IEEE Conference on Decision and Control*, pp. 1466-1473, 2012.
[NPL 23]
Todorov, E. Linearly-solvable Markov decision problems. *Advances in Neural Information Processing Systems* 19, pp. 1369-1376. MIT Press, 2007.
[NPL 24]
Todorov, E. Efficient computation of optimal actions. *Proceedings of the National Academy of Sciences of the United States of America*, 106(28): 11478-83, 2009.
[NPL 25]
Todorov, E. Eigenfunction approximation methods for linearly-solvable optimal control problems. In *Proc. of the 2nd IEEE Symposium on Adaptive Dynamic Programming and Reinforcement Learning*, pp. 161-168, 2009.
[NPL 26]
Ziebart, B. D., Maas, A., Bagnell, J. A., and Dey, A. K. Maximum entropy inverse reinforcement learning. In *Proc. of the 23rd AAAI Conference on Artificial Intelligence*, 2008.
[NPL 27]
Vroman, M. (2014). Maximum likelihood inverse reinforcement learning. PhD Thesis, Rutgers University, 2014.
[NPL 28]
Raita, H. (2012). On the performance of maximum likelihood inverse reinforcement learning. arXiv preprint.
[NPL 29]
Choi, J. and Kim, K. (2012). Nonparametric Bayesian inverse reinforcement learning for multiple reward functions. NIPS 25.
[NPL 30]
Choi, J. and Kim, J. (2011). Inverse reinforcement learning in partially observable environments. Journal of Machine Learning Research.
[NPL 31]]
Neu, and Szepesvari, C. (2007). Apprenticeship learning using inverse reinforcement learning and gradient methods. In Proc. of UAI.
[NPL 32]
Mahadevan, S. (2005). Proto-value functions: developmental reinforcement learning. In Proc. of the 22nd ICML.

Patent Literature

[PL 1]
U.S. Pat. No. 8,756,177B, Methods and systems for estimating subject intent from surveillance.
[PL 2]
U.S. Pat. No. 7,672,739. System for multiresolution analysis assisted reinforcement learning approach to run-by-run control.
[PL 3]
Japanese Patent JP5815458. Reward function estimating device, method and program.

SUMMARY OF INVENTION

Technical Problem

Inverse reinforcement learning is a framework to solve the above problems, but as mentioned above, the existing methods have the following drawbacks: (1) intractable when the state is continuous, (2) computational cost is expensive, and (3) entire trajectories of states should be necessary to estimate. Methods disclosed in this disclosure solve these drawbacks. In particular, the previous method proposed in NPL 14 does not work well as many previous studies reported. Moreover, the method proposed in NPL 6 cannot solve continuous problems in practice because their algorithm involves a complicated evaluation of integrals.

The present invention is directed to system and method for inverse reinforcement learning.

An object of the present invention is to provide a new and improved inverse reinforcement learning system and method so as to obviate one or more of the problems of the existing art.

Solution to Problem

To achieve these and other advantages and in accordance with the purpose of the present invention, as embodied and broadly described, in one aspect, the present invention provides a method of inverse reinforcement learning for estimating reward and value functions of behaviors of a subject, comprising: acquiring data representing changes in state variables that define the behaviors of the subject; applying a modified Bellman equation given by Eq. (1) to the acquired data:

$$r(x) + \gamma V(y) - V(x) = \ln \frac{\pi(y|x)}{b(y|x)}, \quad (1)$$

$$= \ln \frac{\pi(x, y)}{b(x, y)} - \ln \frac{\pi(x)}{b(x)}, \quad (2)$$

where r(x) and V(x) denote a reward function and a value function, respectively, at state x, and γ represents a discount factor, and b(y|x) and π(y|x) denote state transition probabilities before and after learning, respectively; estimating a logarithm of the density ratio π(x)/b(x) in Eq. (2); estimating r(x) and V(x) in Eq. (2) from the result of estimating a log of the density ratio π(x,y)/b(x,y); and outputting the estimated r(x) and V(x).

In another aspect, the present invention provides a method of inverse reinforcement learning for estimating reward and value functions of behaviors of a subject, comprising: acquiring data representing state transition with action that define the behaviors of the subject; applying a modified Bellman equation given by Eq. (3) to the acquired data:

$$r(x) + \gamma \int P_T(y \mid x, u) V(y) dy - V(x) = \ln \frac{\pi(u \mid x)}{b(u \mid x)}, \quad (3)$$

$$= \ln \frac{\pi(x, u)}{b(x, u)} - \ln \frac{\pi(x)}{b(x)}, \quad (4)$$

where r(x) and V(x) denote a reward function and a value function, respectively, at state x, and γ represents a discount factor, and b(u|x) and π(u|x) denote, respectively, stochastic policies before and after learning that represent a probability to select action u at state x; estimating a logarithm of the density ratio π(x)/b(x) in Eq. (3); estimating r(x) and V(x) in Eq. (4) from the result of estimating a log of the density ratio π(x,u)/b(x,u); and outputting the estimated r(x) and V(x).

In another aspect, the present invention provides a non-transitory storage medium storing instructions to cause a processor to perform an algorithm for inverse reinforcement learning for estimating cost and value functions of behaviors of a subject, said instructions causing the processor to perform the following steps: acquiring data representing changes in state variables that define the behaviors of the subject; applying a modified Bellman equation given by Eq. (1) to the acquired data:

$$r(x) + \gamma V(y) - V(x) = \ln \frac{\pi(y \mid x)}{b(y \mid x)}, \quad (1)$$

$$= \ln \frac{\pi(x, y)}{b(x, y)} - \ln \frac{\pi(x)}{b(x)}, \quad (2)$$

where r(x) and V(x) denote a reward function and a value function, respectively, at state x, and γ represents a discount factor, and b(y|x) and π(y|x) denote state transition probabilities before and after learning, respectively; estimating a logarithm of the density ratio π(x)/b(x) in Eq. (2); estimating r(x) and V(x) in Eq. (2) from the result of estimating a log of the density ratio π(x,y)/b(x,y); and outputting the estimated r(x) and V(x).

In another aspect, the present invention provides a system for inverse reinforcement learning for estimating cost and value functions of behaviors of a subject, comprising: a data acquisition unit to acquire data representing changes in state variables that define the behaviors of the subject; a processor with a memory, the processor and the memory are configured to: applying a modified Bellman equation given by Eq. (1) to the acquired data:

$$r(x) + \gamma V(y) - V(x) = \ln \frac{\pi(y \mid x)}{b(y \mid x)}, \quad (1)$$

-continued $$= \ln \frac{\pi(x, y)}{b(x, y)} - \ln \frac{\pi(x)}{b(x)}, \quad (2)$$

where r(x) and V(x) denote a reward function and a value function, respectively, at state x, and γ represents a discount factor, and b(y|x) and π(y|x) denote state transition probabilities before and after learning, respectively; estimating a logarithm of the density ratio π(x)/b(x) in Eq. (2); estimating r(x) and V(x) in Eq. (2) from the result of estimating a log of the density ratio π(x,y)/b(x,y); and an output interface that outputs the estimated r(x) and V(x).

In another aspect, the present invention provides a system for predicting a preference in topic of articles that a user is likely to read from a series of articles the user selected in an Internet web surfing, comprising: the system for inverse reinforcement learning as set forth in claim 8, implemented in a computer connected to the Internet, wherein said subject is the user, and said state variables that define the behaviors of the subject include topics of articles selected by the user while browsing each webpage, and wherein the processor causes an interface through which the user is browsing Internet websites to display a recommended article for the user to read in accordance with the estimated cost and value functions.

In another aspect, the present invention provides a method for programming a robot to perform complex tasks, comprising: controlling a first robot to accomplish a task so as to record a sequence of states and actions; estimating the reward and value functions using the system for inverse reinforcement learning as set forth in claim 8 based on the recorded sequence of the states and actions; and providing the estimated reward and value functions to a forward reinforcement leaning controller of a second robot to program the second robot with the estimated reward and value functions.

Advantageous Effects of Invention

According to one or more aspects of the present invention, it becomes possible to perform inverse reinforcement learning effectively and efficiently. In some embodiments, there is no need to know the environmental dynamics in advance and there is no need to execute integration.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory, and are intended to provide further explanation of the invention as claimed.

BRIEF DESCRIPTION OF DRAWINGS

FIG. 10 schematically shows a series of clicking actions by a web-visitor, showing the visitor's preference in topic in web surfing.

FIG. 13 schematically explains the computational scheme of the second DRE for step (2) in Embodiment 2.

DESCRIPTION OF EMBODIMENTS

Figure 1:
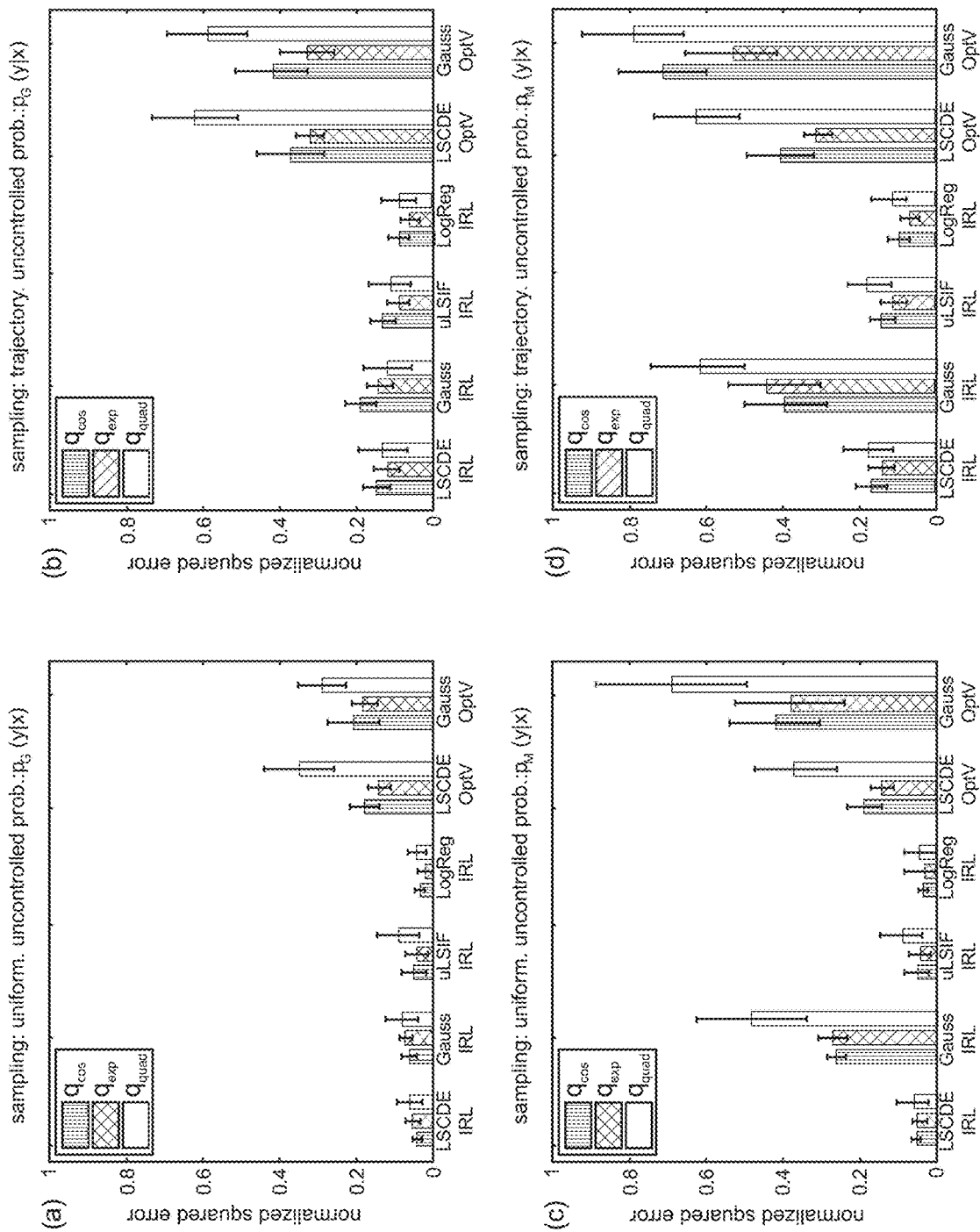
FIG. 1 shows normalized squared errors for the results of the swing-up inverted pendulum experiments to which embodiments of the present invention was applied for each of the following density ratio estimation methods: (1) LSCDE-IRL, (2) uLSIF-IRL, (3) LogReg-IRL, (4) Gauss-IRL, (5) LSCDE-OptV, and (6) Gauss-OptV. As indicated in the drawing, (a)-(d) differ from each other in terms of sampling methods and other parameters.

The present disclosure provides a novel inverse reinforcement learning method and system based on density ratio estimation under the framework of Linearly solvable Markov Decision Process (LMDP). In LMDP, the logarithm of the ratio between the controlled and uncontrolled state transition densities is represented by the state-dependent cost and value functions. Previously, the present inventors have devised novel inverse reinforcement learning method and system, as described in PCT International Application No. PCT/JP2015/004001, in which a novel Bellman equation is used to estimate the cost and value functions, and in embodiments thereof, density ratio estimation methods are used to estimate the transition density ratio, and the least squares method with regularization is used to estimate the state-dependent cost and value functions that satisfy the relation. That method can avoid computing the integral such as evaluating the partition function. The present disclosure includes the descriptions of the invention described in PCT/JP2015/004001 as Embodiment 1 below, and further describes a new embodiment as Embodiment 2 that has improved characteristics in several aspects than Embodiment 1. The subject matter described and/or claimed in PCT/JP2015/004001 is not prior art against Embodiment 2.

As described below, in Embodiment 1, a simple numerical simulation of a pendulum swing-up was performed, and its superiority over conventional methods have been demonstrated. The present inventors further apply the method to humans behaviors in performing a pole balancing task and show that the estimated cost functions can predict the performance of the subjects in new trials or environments in a satisfactory manner.

One aspect of the present invention is based on the framework of linearly solvable Markov decision processes like the OptV algorithm. In Embodiment 1, the present inventors have derived a novel Bellman equation given by:

$$-\ln\frac{\pi(y|x)}{p(y|x)} = q(x) + \gamma V(y) - V(x),$$

where q(x) and V(x) denote the cost and value function at state x and γ represents a discount factor. p(y|x) and π(y|x) denote the state transition probabilities before and after learning, respectively. The density ratio, the left hand side of the above equation, is efficiently computed from observed behaviors by density ratio estimation methods. Once the density ratio is estimated, the cost and value function can be estimated by regularized least-squares method. An important feature is that our method can avoid computing the integrals, where it is usually calculated with high computational cost. The present inventors have applied this method to humans behaviors in performing a pole balancing task and show that the estimated cost functions can predict the performance of the subjects in new trials or environments, verifying universal applicability and effectiveness of this new computation technique in inverse reinforcement learning, which has well-recognized wide applicability in control system, machine learning, operations research, information theory, etc.

I. Embodiment 1

<1. Linearly Solvable Markov Decision Process>
<1.1. Forward Reinforcement Learning>

The present disclosure provides a brief introduction of Markov Decision Process and its simplification for a discrete-time continuous-space domain. Let $\mathcal{X}$ and $\mathcal{U}$ be the continuous state and continuous action spaces, respectively. At a time step t, a learning agent observes the environmental current state $x_t \in \mathcal{X}$ and executes action $u_t \in \mathcal{U}$ sampled from a stochastic policy $\pi(u_t|x_t)$. Consequently, an immediate cost $c(x_t, u_t)$ is given from the environment and the environment makes a state transition according to a state transition probability $P_T(y|x_t, u_t)$ from $x_t$ to $y \in \mathcal{X}$ under the action $u_t$. The goal of reinforcement learning is to construct an optimal policy $\pi(u|x)$ which minimizes the given objective function. There exist several objective functions and the most widely used one is a discounted sum of costs given by:

$$V(x) = \mathbb{E}\left[\sum_{t=0}^{\infty} \gamma^t c(x_t, u_t)\right], \quad (1)$$

where $\gamma \in [0, 1)$ is called the discount factor. It is known that the optimal value function satisfies the following Bellman equation:

$$V(x) = \min_u \left[ c(x, u) + \gamma \mathbb{E}_{y \sim P_T(\cdot|x,u)}[V(y)] \right] \quad (2)$$

Eq. (2) is a nonlinear equation due to the min operator.

Linearly solvable Markov Decision Process (LMDP) simplifies Eq. (2) under some assumptions (Todorov, 2007; 2009a, NPLs 23-24). The key trick of LMDP is to optimize the state transition probability directly instead of optimizing the policy. More specifically, two conditional probability density functions are introduced. One is the uncontrolled probability denoted by $p(y|x)$ which can be regarded as an innate state transition. $p(y|x)$ is arbitrary and it can be constructed by $p(y|x) = \int P_T(y|x,u) \pi_0(u|x) du$, where $\pi_0(u|x)$ is a random policy. The other is the controlled probability denoted by $\pi(y|x)$ which can be interpreted as an optimal state transition. Then, the cost function is restricted to the following form:

$$c(x,u) = q(x) + KL(\pi(\cdot|x) \| p(\cdot|x)), \quad (3)$$

where $q(x)$ and $KL(\pi(\cdot|x) \| p(\cdot|x))$ denote the state dependent cost function and Kullback Leibler divergence between the controlled and uncontrolled state transition densities, respectively. In this case, the Bellman equation (2) is simplified to the following equation:

$$\exp(-V(x)) = \exp(-q(x)) \int p(y|x) \exp(-\gamma V(y)) dy. \quad (4)$$

The optimal controlled probability is given by:

$$\pi(y|x) = \frac{p(y|x) \exp(-\gamma V(y))}{\int p(y'|x) \exp(-\gamma V(y')) dy'}. \quad (5)$$

It should be noted that Eq. (4) is still nonlinear even though the desirability function $Z(x) = \exp(-V(x))$ is introduced because of the existence of the discount factor $\gamma$. In the forward reinforcement learning under the framework of LMDP, $V(x)$ is computed by solving Eq. (4), then $\pi(y|x)$ is computed (Todorov, 2009, NPL 25).

<1.2. Inverse Reinforcement Learning>

The inverse reinforcement learning (IRL) algorithm under LMDP was proposed by Dvijotham and Todorov (2010) (NPL 6). In particular, OptV is quite efficient for discrete state problems. The advantage of OptV is that the optimal state transition is explicitly represented by the value function so that the maximum likelihood method can be applied to estimate the value function. Suppose that the observed trajectories are generated by the optimal state transition density (5). The value function is approximated by the following linear model:

$$\hat{V}(x) = w_V^T \psi_V(x), \quad (6)$$

where $w_V$ and $\psi_V(x)$ denote the learning weights and basis function vector, respectively.

Since the controlled probability is given by Eq. (5), the weight vector $w_V$ can be optimized by maximizing the likelihood. Suppose that we have a dataset of state transitions:

$$\mathcal{D}^\pi = \{(x_j^\pi, y_j^\pi)\}_{j=1}^{N^\pi}, \quad y_j^\pi \sim \pi(\cdot | x_j^\pi), \quad (7)$$

where $N^\pi$ denotes the number of data from the controlled probability. Then, the log-likelihood and its derivative are given by:

$$L(w_V) = \sum_{j=1}^{N^\pi} \ln \pi(y_j^\pi | x_j^\pi; w_V), \quad (8)$$

$$\frac{\partial L(w_V)}{\partial w_V} = \sum_{j=1}^{N^\pi} \left[ -\psi_V(y_j^\pi) + \int \pi(y|x_j^\pi; w_V) \psi_V(y) dy \right],$$

where $\pi(y|x; w_V)$ is the controlled policy in which the value function is parameterized by Eq. (6). Once the gradient is evaluated, the weight vector $w_V$ is updated according to the gradient ascent method.

After the value function is estimated, the simplified Bellman equation (4) can be used to retrieve the cost function. It means that the cost function $q(x)$ is uniquely determined when $\hat{V}(x; w_V)$ and $\gamma$ are given, and $q(x)$ is expressed by the basis functions used in the value function. While the representation of the cost function is not important in the case of imitation learning, we want to find a simpler representation of the cost for analysis. Therefore, the present inventors introduce an approximator:

$$\hat{q}(x) = w_q^T \psi_q(x), \quad (9)$$

where $w_q$ and $\psi_q(x)$ denote the learning weights and basis function vector, respectively. The objective function with L1 regularization to optimize $w_q$ is given by:

$$J(w_q) = \quad (10)$$
$$\frac{1}{2} \sum_{j=1}^{N^\pi} \left[ w_q \psi_q(x_j^\pi) - \hat{V}(x_j^\pi; w_V) - \ln \int p(y|x_j^\pi) \exp(-\gamma \hat{V}(y; w_V)) dy \right]^2 +$$
$$\frac{\lambda_q}{2} \| w_q \|_1$$

where $\lambda_q$ is a regularization constant. A simple gradient descent algorithm is adopted, and $J(w_q)$ is evaluated at the observed states.

The most significant problem of Dvijotham and Todorov (2010) (NPL 6) is the integral in Eqs. (8) and (10) which cannot be solved analytically, and they discretized the state space and replaced the integral with a sum. However, as they suggested, it is infeasible in high-dimensional problems. In addition, the uncontrolled probability $p(y|x)$ is not necessarily Gaussian. In at least some embodiments of the present invention, the Metropolis Hastings algorithm is applied to evaluate the gradient of the log-likelihood, in which the uncontrolled probability $p(y|x)$ is used as a causal density.

<2. Inverse Reinforcement Learning by Density Ratio Estimation>

<2.1. Bellman Equation for IRL>

From Equations (4) and (5), the present inventors have derived the following important relation for the discounted-cost problems:

$$q(x) + \gamma V(y) - V(x) = -\ln \frac{\pi(y|x)}{p(y|x)}. \quad (11)$$

Eq. (11) plays an important role in the IRL algorithms according to embodiments of the present invention. Similar equations can be derived for first-exit, average cost, and finite horizon problems. It should be noted that the left hand side of Eq. (11) is not a temporal difference error because q(x) is the state-dependent part of the cost function shown in Eq. (3). Our IRL is still an ill-posed problem and the cost function is not uniquely determined although the form of the cost function is constrained by Eq. (3) under LMDP. More specifically, if the state-dependent cost function is modified by:

$$q'(x)=q(x)+C, \qquad (12)$$

the corresponding value function is changed to:

$$V'(x) = V(x) + \frac{C}{1-\gamma}, \qquad (13)$$

where C is a constant value. Then, the controlled probability derived from V(x) is identical to that from V'(x). This property is useful when estimating the cost function as described below. In one aspect of the present invention, the disclosed IRL method consists of two parts. One is to estimate the density ratio of the right hand side of Eq. (11) described below. The other is to estimate q(x) and V(x) by the least squares method with regularization as shown below.

<2.2. Density Ratio Estimation for IRL>

Estimating the ratio of controlled and uncontrolled transition probability densities can be regarded as a problem of density ratio estimation (Sugiyama et al., 2012, NPL 20). According to the setting of the problem, the present disclosure considers the following formulation.

<2.2.1. General Case>

First, a general setting is considered. Suppose that we have two datasets of state transitions: One is $\mathcal{D}^\pi$ shown in Eq. (7) and the other is a dataset from the uncontrolled probability:

$$\mathcal{D}^p = \{(x_j^p, y_j^p)\}_{j=1}^{N^p}, y_j^p \sim p(\cdot \mid x_j^p),$$

where $N^p$ denotes the number of data. Then, we are interested in estimating the ratio $\pi(y|x)/p(y|x)$ from $\mathcal{D}^p$ and $\mathcal{D}^\pi$.

From Eq. (11), we can consider the following two decompositions:

$$-\ln \frac{\pi(y \mid x)}{p(y \mid x)} = \ln p(y \mid x) - \ln \pi(y \mid x) \qquad (14)$$

$$= \ln \frac{\pi(x)}{p(x)} - \ln \frac{\pi(x,y)}{p(x,y)}. \qquad (15)$$

The first decomposition (14) shows the difference of logarithms of conditional probability densities. In order to estimate Eq. (14), the present disclosure considers two implementations. The first one is LSCDE-IRL which adopts Least Squares Conditional Density Estimation (LSCDE) (Sugiyama et al., 2010) to estimate π(y|x) and p(y|x). The other is Gauss-IRL which uses a Gaussian process (Rasmussen & Williams, 2006, NPL 15) to estimate the conditional densities in Eq. (14).

The second decomposition (15) shows the difference of logarithms of density ratio. The advantage of the second decomposition is that ln π(x)/p(x) can be neglected if π(x)=p(x). This condition may be satisfied according to the setup. Currently, two methods are implemented to estimate π(x)/p(x) and π(x,y)/p(x,y). One is uLSIF-IRL using the unconstrained Least Squares Importance Fitting (uLSIF) (Kanamori et al., 2009, NPL 9). The other is LogReg, which utilizes a logistic regression in a different way. Section 2.3 below describes their implementation.

<2.2.2. When p(y|x) is Unknown>

The state transition probability $P_T$ (y|x, u) is assumed to be known in advance in the case of standard IRL problems, and this corresponds to the assumption that the uncontrolled probability p(y|x) is given in the case of LMDP. This can be regarded as a model-based IRL. In this case, Eq. (14) is appropriate and it is enough to estimate the controlled probability π(y|x) from the dataset $\mathcal{D}^\pi$.

In some situations, we have neither an analytical model nor a dataset from the uncontrolled probability density. Then, p(y|x) is replaced by a uniform distribution, which is an improper distribution for unbounded variables. Without loss of generality, p(y|x) is set to 1 since it can be compensated by shifting the cost and value function by Eqs. (12) and (13).

<2.3. Density Ratio Estimation Algorithms>

This section describes density ratio estimation algorithms appropriate for the IRL method disclosed in this disclosure.

<2.3.1. uLSIF> uLSIF (Kanamori et al., 2009, NPL 9) is a least-squares method for the direct density ratio estimation method. The goal of uLSIF is to estimate the ratio of two densities π(x)/p(x) and π(x,y)/p(x,y). Hereafter, the present disclosure explains how to estimate r(z)=π(z)/p(z) from $\mathcal{D}^p$ and $\mathcal{D}^\pi$, where z=(x,y) for simplicity. Let us approximate the ratio by the linear model:

$$\hat{r}(z) = \alpha^T \phi(z),$$

where φ(z) denotes the basis function vector and α are the parameters to be learned, respectively. The objective function is given by:

$$J(\alpha) = \frac{1}{2}\int (\hat{r}(z) - r(z))^2 p(z)dz + \frac{\lambda}{2}\|\alpha\|_2^2 = \qquad (16)$$
$$\frac{1}{2}\alpha^T H \alpha - h^T \alpha + \frac{\lambda}{2}\|\alpha\|_2^2 + const.,$$

where λ is a regularization constant and $$H = \int \phi(z)\phi(z)^T p(z)dz \approx \frac{1}{N^p}\sum_{i=1}^{N^p} \phi(z_i^p)\phi(z_i^p)^T,$$

$$h = \int \phi(z)\pi(z)dz \approx \frac{1}{N^\pi}\sum_{j=1}^{N^\pi} \phi(z_j^\pi).$$

It should be noted that H is estimated from $\mathcal{D}^p$ while h from $\mathcal{D}^\pi$, respectively. Eq. (16) can be analytically minimized as $(\hat{H}+\lambda I)^{-1}\hat{h}$, but this minimizer ignores the non-negativity constraint of the density ratio. To compensate for this problem, uLSIF modifies the solution by:

$$\hat{\alpha}(\lambda) = \max(0, (\hat{H}+\lambda I)^{-1}\hat{h}), \qquad (17)$$

where the max operator above is applied in the element-wise manner. As recommended by Kanamori et al. (2009) (NPL 9), a Gaussian function centered at the states of $\mathcal{D}^\pi$ is used as a basis function described by:

$$\phi_j(z) = \exp\left(-\frac{\|z - z_j^\pi\|_2^2}{2\sigma^2}\right), \quad (18)$$

where α is a width parameter. $z_j^\pi$ is the state which is randomly selected from $\mathcal{D}^\pi$. The parameters λ and σ are selected by leave-one-out cross-validation.

<2.3.2. LSCDE>

LSCDE (Sugiyama et al., 2010, NPL 19) is regarded as a special case of uLSIF to estimate a conditional probability density function. For example, the objective function to estimate $\pi(y|x) = \pi(x,y)/\pi(x)$ from $\mathcal{D}^\pi$ is given by:

$$J(\alpha) = \frac{1}{2}\int\int(\hat{r}(x,y) - r(x,y))^2 p(x)dxdy + \frac{\lambda}{2}\|\alpha\|_2^2 =$$
$$\frac{1}{2}\alpha^T H\alpha - h^T\alpha + \frac{\lambda}{2}\|\alpha\|_2^2 + const.,$$

where $\hat{r}(x,y) = \alpha^T \phi(x,y)$ is a linear model and A is a regularization constant. Computing H and h in LSCDE are slightly different from those in uLSIF, and they are computed as follows:

$$H = \int \Phi(x)\pi(x)dx \approx \frac{1}{N^\pi}\sum_{j=1}^{N^\pi}\Phi(x_j^\pi),$$

$$h = \int \phi(x,y)\pi(x,y)dxdy \approx \frac{1}{N^\pi}\sum_{j=1}^{N^\pi}\phi(x_j^\pi, y_j^\pi).$$

where $\Phi$ is defined as:

$$\Phi \triangleq \int \phi(x,y)\phi(x,y)^T dy.$$

Since the basis function shown in Eq. (18) is used, this integral can be computed analytically. The estimated weight of LSCDE is given by Eq. (17). In order to assure that the estimated ratio is a conditional density, the solution should be normalized when it is used to estimate the cost and value function.

<2.3.3. LogReg>

LogReg is a method of density estimation using a logistic regression. Let us assign a selector variable η=−1 to samples from the uncontrolled probability and η=1 to samples from the controlled probability:

$$p(z) = Pr(z|\eta = -1), \pi(z) = Pr(z|\eta = 1).$$

The density ratio can be represented by applying the Bayes rule as follows:

$$\frac{\pi(z)}{p(z)} = \frac{Pr(\eta = -1)}{Pr(\eta = 1)} \frac{Pr(\eta = 1|z)}{Pr(\eta = -1|z)}.$$

The first ratio $Pr(\eta=-1)/Pr(\eta=1)$ is estimated by $N^P/N^\pi$ and the second ratio is computed after estimating the conditional probability $p(i|z)$ by a logistic regression classifier:

$$p(\eta|z) = \frac{1}{1 + \exp(-\eta \alpha^T \phi(z))},$$

where η can be regarded as a label. It should be noted that a logarithm of the density ratio is given by a linear model in the case of LogReg:

$$\ln\frac{\pi(z)}{p(z)} = \alpha^T\phi(z) + \ln\frac{N^P}{N^\pi},$$

The second term $\ln N^P/N^\pi$ can be ignored in our IRL formulation shown in Eq. (15).

The objective function is derived from the negative regularized log-likelihood expressed by:

$$J(\alpha) = \sum_{i=1}^{N^P}\ln(1 + \exp(\alpha^T\phi(z_i^P))) + \sum_{j=1}^{N^\pi}\ln(1 + \exp(-\alpha^T\phi(z_j^\pi))) + \frac{\lambda}{2}\|\alpha\|_2^2$$

The closed-form solution is not derived, but it is possible to minimize efficiently by standard nonlinear optimization methods since this objective function is convex.

<2.4. Estimating the Cost and Value Functions>

Once the density ratio $\pi(y|x)/p(y|x)$ is estimated, the least squares method with regularization is applied to estimate the state-dependent cost function q(x) and value function V(x). Suppose that $\hat{R}(x,y)$ is an approximation of a negative log ratio;

$$\hat{R}(x,y) = -\ln\frac{\pi(y|x)}{p(y|x)}$$

and consider linear approximators of q(x) and V(x) as defined in Eqs. (6) and (9), respectively. The objective function is given by:

$$J(w_q, w_V) = \frac{1}{2}\sum_{j=1}^{N^\pi}\left[w_V^T(\gamma\psi_V(y_j^\pi) - \psi_V(x_j^\pi)) + w_q^T\psi_q(x_j^\pi) - \hat{R}(x_j^\pi, y_j^\pi)\right]^2 +$$
$$\frac{\lambda_q}{2}\|w_q\|_1 + \frac{\lambda_V}{2}\|w_V\|_1$$

where $\lambda_q$ and $\lambda_V$ are regularization constants. L2 regularization is used for $w_V$ because L2 regularization is an effective means of achieving numerical stability. On the other hand, L1 regularization is used for $w_q$ to yield sparse models that are more easily interpreted by the experimenters. It is possible to use L2 regularization for $w_q$ if sparseness is not important. In addition, the non-negative constraints of $w_q$ and $w_V$ are not introduced because Eq. (12) can be used by setting $C = -\min \hat{q}(x; w_q)$ to satisfy the non-negativity of the cost function efficiently. Theoretically, we can choose arbitrary basis functions. In one embodiment of the present invention, a Gaussian function shown in Eq. (18) is used for simplicity:

$$\psi_{q,j}(x) \equiv \psi_{V,j}(x) = \exp\left(-\frac{\|x - x_j^\pi\|^2}{2\sigma^2}\right)$$

where σ is a width parameter. The center position $x_j^\pi$ is randomly selected from $\mathcal{D}^\pi$.

<3. Experiments>
<3.1. Swing-Up Inverted Pendulum>
<3.1.1. Task Description>

To demonstrate and confirm the effectiveness of the above-described embodiments belonging to Embodiment 1 of the present invention, the present inventors have studied a swing-up inverted pendulum problem in which the state vector is given by a two dimensional vector $x=[\theta,\omega]^T$, where $\theta$ and $\omega$ denote the angle and the angular velocity of the pole, respectively. The equation of motion is given by the following stochastic differential equation:

$$dx = \begin{bmatrix} \dot{\theta} \\ m\frac{g}{l}\sin\theta - \kappa\dot{\theta} \end{bmatrix} dt + \begin{bmatrix} 0 \\ 1 \end{bmatrix} (udt + \sigma_e d\omega),$$

where l, m, g, $\kappa$, $\sigma_e$, and $\omega$ denote the length of the pole, mass, gravitational acceleration, coefficient of friction, scaling parameter for the noise, and Brownian noise, respectively. As opposed to the previous studies (Deisenroth et al., 2009, NPL 4; Doya, 2000, NPL 5), the applied torque u is not restricted and it is possible to swing-up directly. By discretizing the time axis with step h, the corresponding state transition probability $P_T(y|x, u)$, which is represented by a Gaussian distribution, is obtained. In this simulation, the parameters are given as follows: l=1 [m], m=1 [kg], g=9.8 [m/s$^2$], and $\kappa$=0.05 [kg m$^2$/s], h=0.01 [s], $\sigma_e$=4, and $\gamma=10^{-0.025}\approx0.94$. The present inventors have conducted a series of experiments by changing (1) the state dependent cost function q(x), (2) the uncontrolled probability p(y|x), and (3) the datasets $\mathcal{D}^p$ and $\mathcal{D}^\pi$ as follows.

<Cost Function>

The goal is to keep the pole upright and the following three cost functions are prepared:

$$q_{cos}(x)=1-\cos\theta, q_{quad}(x)=x^T Q x,$$

$$q_{exp}(x)=1-\exp(-\tfrac{1}{2}x^T Q x), \quad (19)$$

where Q=diag[1, 0.2]. $q_{cost}(x)$ is used by Doya (2000) while $q_{exp}(x)$ by Deisenroth et al. (2009) (NPL 4).

<Uncontrolled Probability>

Two densities $p_G(y|x)$ and $p_M(y|x)$ are considered. $p_G(y|x)$ is constructed by using a stochastic policy $\pi(u|x)$ represented by a Gaussian distribution. Since the equation of motion in discrete time is given by the Gaussian, $p_G(y|x)$ is also Gaussian. In the case of $p_M(y|x)$, a mixture of Gaussian distributions is used as a stochastic policy.

<Preparation of the Datasets>

Two sampling methods are considered. One is the uniform sampling and the other is the trajectory-based sampling. In the uniform sampling method, x is sampled from a uniform distribution defined over the entire state space. In other words, p(x) and $\pi(x)$ are regarded as a uniform distribution. Then, y is sampled from the uncontrolled and the controlled probability to construct $\mathcal{D}^p$ and $\mathcal{D}^\pi$, respectively. In the trajectory-based sampling method, p(y|x) and $\pi(y|x)$ are used to generate trajectories of states from the same start state $x_0$. Then, a pair of state transitions are randomly selected from the trajectories to construct $\mathcal{D}^p$ and $\mathcal{D}^\pi$. It is expected that p(x) is different from $\pi(x)$.

For each cost function, the corresponding value function is calculated by solving Eq. (4) and the corresponding optimal controlled probability is evaluated by Eq. (5). In the previous method (Todorov, 2009b, NPL 25), exp(-V(x)) is represented by a linear model, but it is difficult under the objective function (1) because the discount factory makes the linear model complicated. Therefore, the value function is approximated by the linear model shown in Eq. (6) and the Metropolis Hastings algorithm is used to evaluate the integral.

The methods according to the embodiments of the present invention in Embodiment 1 can be compared with OptV because the assumptions of OptV are identical to those of our methods according to the embodiments of the present invention. According to the choice of the density ratio estimation methods, there exist several variants as described above. More specifically, the following six algorithms are considered: (1) LSCDE-IRL, (2) uLSIF-IRL, (3) LogReg-IRL, (4) Gauss-IRL, (5) LSCDE-OptV, which is the OptV method where p(y|x) is estimated by LSCDE, and (6) Gauss-OptV, where the Gaussian process method is used to estimate p(y|x).

We set the number of samples of $\mathcal{D}^p$ and $\mathcal{D}^\pi$ at $N^p=N^\pi=300$. The parameters $\lambda_q$, $\lambda_V$, $\sigma$, and $\gamma$ are optimized by cross-validation from the following regions: log $\lambda_q$, log $\lambda_V \in$ linspace(-3, 1, 9), log $\sigma \Sigma$ linspace(-1.5, 1.5, 9), and log$\gamma$ E linspace(-0.2, 0, 9), where linspace($x_{min}$, $x_{max}$, n) generates a set of n points which is equally spaced between $x_{min}$ and $x_{max}$.

<3.1.2. Experimental Results>

The accuracy of the estimated cost functions is measured by the normalized squared error for the test samples:

$$\text{error} \triangleq \sum_{j=1}^{N} \frac{(q(x_j) - \hat{q}(x_j))^2}{(q(x_j))^2}$$

where $q(x_j)$ is one of the true cost function shown in Eq. (19) at state $x_j$ while $\hat{q}(x_j)$ is the estimated cost function, respectively. FIG. 1 (a)-(d) compare the accuracy of the IRL methods of the present embodiments; it is shown that our methods (1)-(4) performed better than OptV methods (5)-(6) in all settings. More specifically, LogReg-IRL showed the best performance, but there were no significant differences among our methods (1)-(3). The accuracy of the cost estimated by Gauss-IRL increased significantly if the stochastic policy $\pi(u|x)$ was given by the mixture of Gaussians because the standard Gaussian process cannot represent the mixture of Gaussians.

Figure 2:
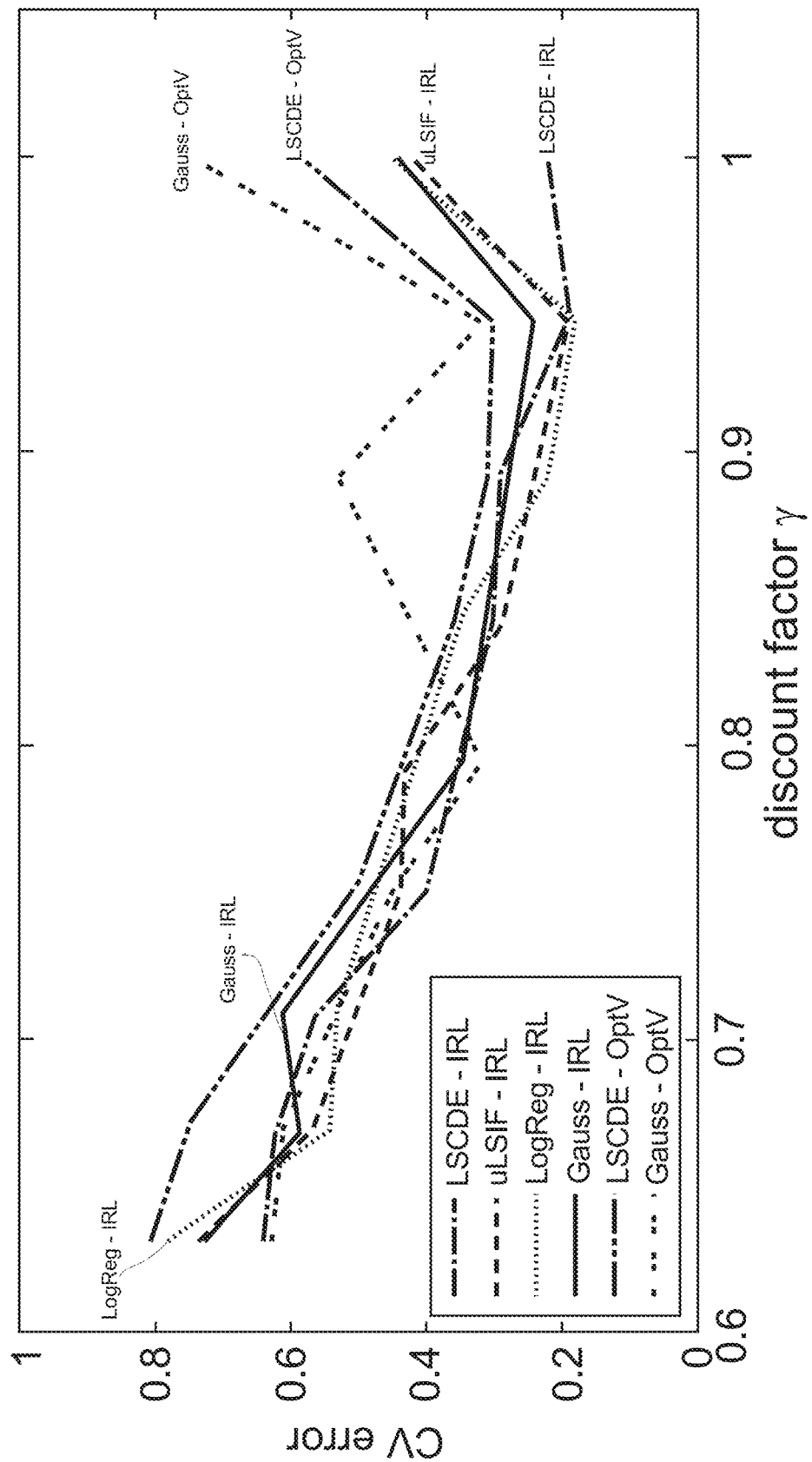
FIG. 2 is a graph showing cross-validation errors in the swing-up inverted pendulum experiments for various density ratio estimation methods.

FIG. 2 shows the cross-validation error of the discount factor $\gamma$ where other parameters such as $\lambda_q$, $\lambda_V$ and $\sigma$ are set to the optimal values. In this simulation, the cross validation error was minimum at the true discount factor $\gamma=10^{-0.025}\approx0.94$ in all the methods. As show in FIG. 2 and also as explained in FIG. 1 above, the embodiments of the present invention have been proven to have sufficiently small errors, confirming the effectiveness of the present invention effective.

<3.2. Human Behavior Analysis>
<3.2.1. Task Description>

Figure 3:
FIG. 3 shows an experimental setup for the pole balancing task for the long pole; left: the start position, middle: the goal position, and right: state variables.

In order to evaluate our IRL algorithm in a realistic situation, the present inventors have conducted a dynamic motor control, pole-balancing problem. FIG. 3 shows the experimental setup. A subject can move the base left, right, top and bottom to swing the pole several times and decelerate the pole to balance it at the upright position. The dynamics is described by the six-dimensional state vector $x=[\theta,\dot\theta, x, \dot x, y, \dot y]^T$, where $\theta$ and $\dot\theta$ are the angle and angular velocity of the pole, x and y are the horizontal and vertical positions of the base, and $\dot{x}$ and $\dot{y}$ are their time derivatives, respectively.

The task was performed under two conditions: long pole (73 cm) and short pole (29 cm). Each subject had 15 trials to balance the pole in each condition. Each trial ended when the subject could keep the pole upright for 3 seconds or 40 seconds elapsed. We collected the data from 7 subjects (5 right-handed and 2 left-handed) and the trajectory-based sampling method was used to construct the following two datasets of controlled probability: $\mathcal{D}_{i,tr}^{\pi}$ for training and $\mathcal{D}_{i,te}^{\pi}$ for testing of the i-th subject. It is assumed that all subjects had a unique uncontrolled probability p(y|x), which was generated by a random policy. This means the datasets $\mathcal{D}_{tr}^{p}$ for training and $\mathcal{D}_{te}^{p}$ for testing are shared among subjects. The number of samples in the datasets was 300.

<4.2.2. Experimental Results>

Figure 4:
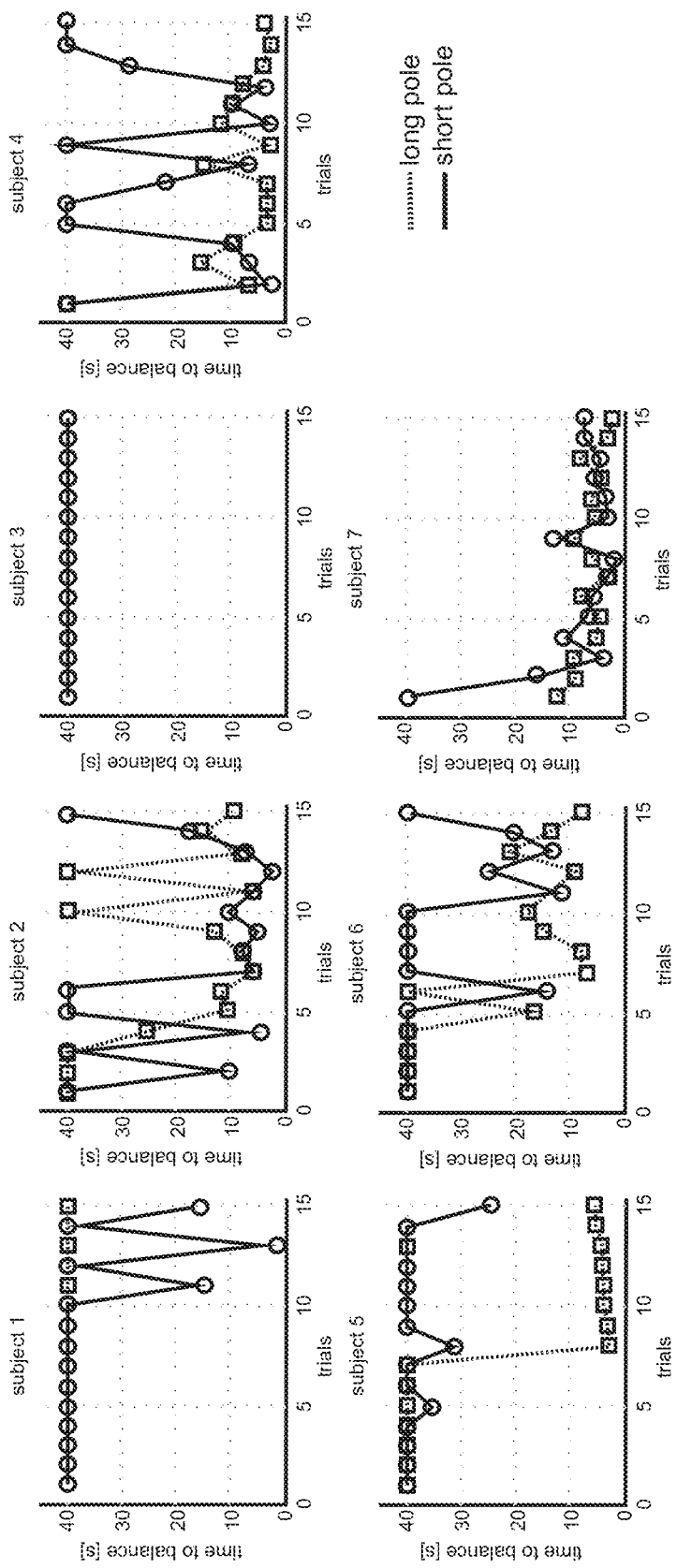
FIG. 4 shows learning curves in the pole balancing task experiment with respect to various subjects according to an embodiment of the present invention; sold line: long pole, dotted line: short pole.

FIG. 4 shows the learning curves of seven subjects, which shows that the learning processes were quite different among subjects. Two subject Nos. 1 and 3 could not accomplish the task. Since a set of successful trajectories should be used by the IRL algorithms, we picked up the data from five subject Nos. 2 and 4-7.

Figure 5:
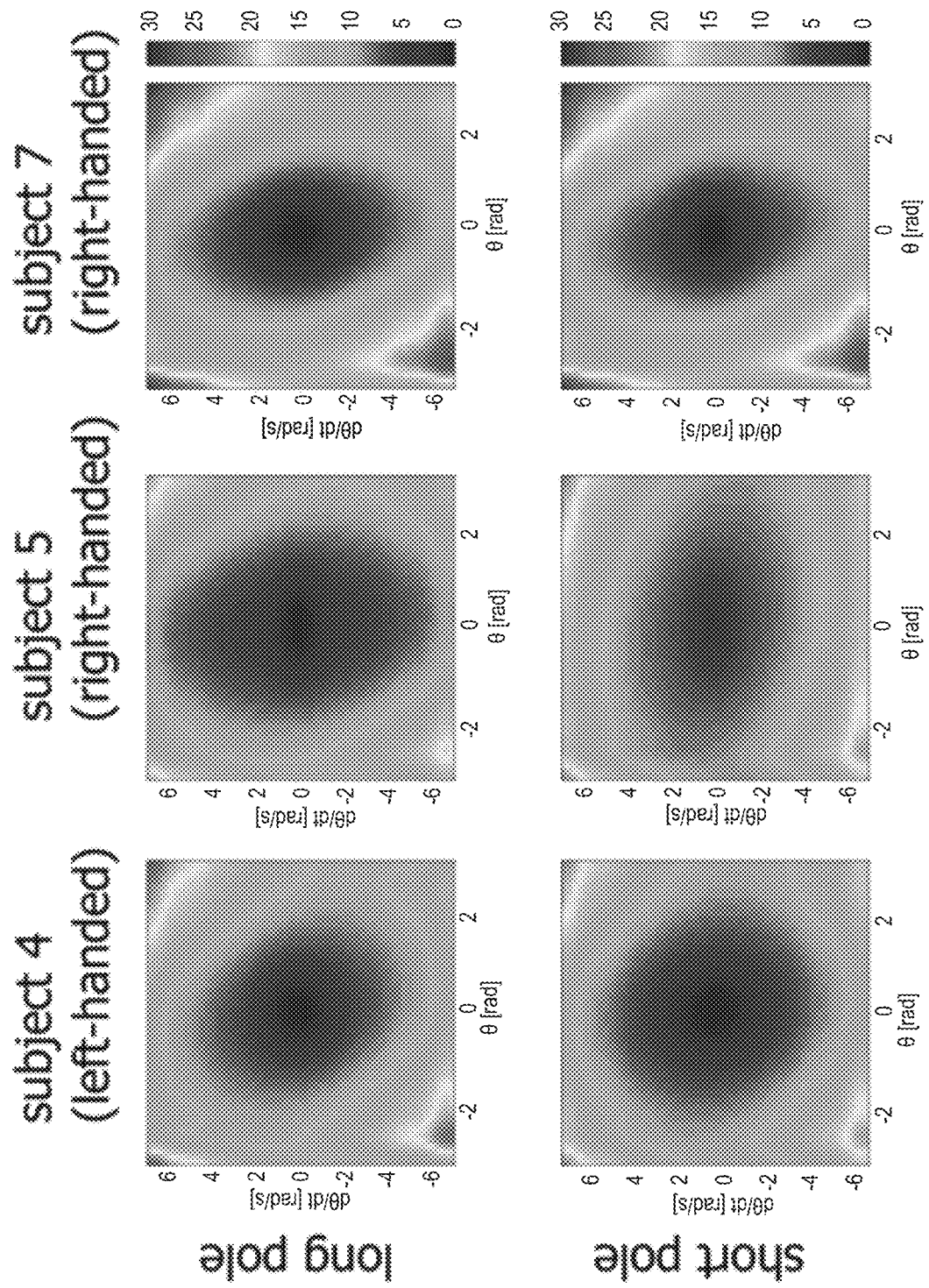
FIG. 5 shows estimated cost functions derived for the pole balancing task experiment according to the embodiment of the present invention for Subject Nos. 4, 5, and 7, projected to the defined subspace.

The experimental results in the case of using LogReg-IRL will be described below (LSCDE-IRL and uLSIF-IRL showed similar results). FIG. 5 shows the estimated cost function of the subjects 4, 5, and 7 projected to the subspace (0, 6) while x, y, $\dot{x}$ and $\dot{y}$ are set to zeros for visualization. In the case of the subject 7, the cost function of the long pole condition was not so different from that of the short pole condition while there was a significant difference in those of the subject 5, who did not perform well in the short pole condition as shown in FIG. 4.

Figure 6:
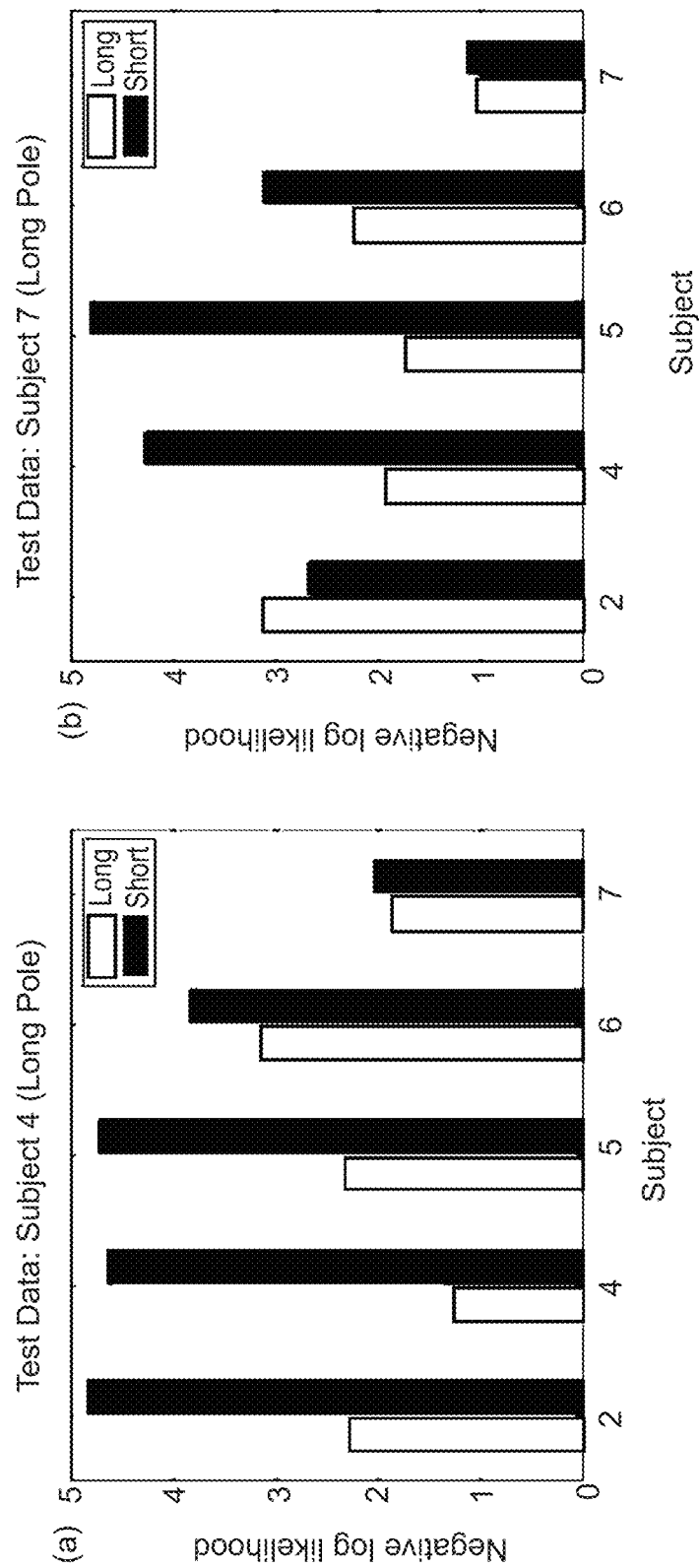
FIG. 6 shows negative log likelihood values for the test datasets in the pole balancing task experiment for Subject Nos. 4 and 7, evaluating the estimated cost functions.

In order to evaluate the cost functions estimated from the training data sets, the present inventors applied the forward reinforcement learning to find the optimal controlled transition probability for the estimated cost function and then computed the negative log-likelihood for the test datasets:

$$NLL(i) \triangleq -\frac{1}{N_{i,te}^{\pi}} \sum_{j=1}^{N_{i,te}^{\pi}} \ln \hat{\pi}(y_j \mid x_j),$$

where $N_{i,te}^{\pi}$ is the number of samples in $\mathcal{D}_{i,te}^{\pi}$. FIG. 6 shows the results. In the left figure (a), we used the test dataset of the subject 4 $\mathcal{D}_{4,te}^{\pi}$ in the long pole condition. The minimum negative log-likelihood was achieved by the cost function estimated from the training datasets $\mathcal{D}_{tr}^{p}$ and $\mathcal{D}_{4,tr}^{\pi}$ of the same condition. The right panel (b) of FIG. 6 shows that the test data of the subject 7 in both the long and short pole conditions were best predicted by the cost function estimated from the training dataset of the same subject 7 only in the long pole condition. Thus, the effectiveness and usefulness of the embodiments of the present invention have been confirmed and demonstrated by this experiment as well.

The present disclosure presented a novel inverse reinforcement learning under the framework of LMDP. One of the features of the present invention is to show Eq. (11), which means the temporal difference error is zero for the optimal value function with the corresponding cost function. Since the right hand side of Eq. (11) can be estimated from samples by the efficient methods of density ratio estimation, the IRL of present invention results in a simple least-squares method with regularization. In addition, the method according to the embodiments of the present invention in Embodiment 1 does not need to compute the integral, which is usually intractable in high-dimensional continuous problems. As a result, the disclosed method is computationally inexpensive than OptV.

LMDP and path integral methods have been receiving attention recently in the field of robotics and machine learning fields (Theodorou & Todorov, 2012, NPL 22) because there exist a number of interesting properties in the linearized Bellman equation (Todorov, 2009a, NPL 24). They have been successfully applied to learning of stochastic policies for robots with large degrees of freedom (Kinjo et al., 2013, NPL 11; Stulp & Sigaud, 2012, NPL 17; Sugimoto and Morimoto, 2011, NPL 18; Theodorou et al., 2010, NPL 21). The IRL methods according to the embodiments of the present invention may be integrated with the existing forward reinforcement learning methods to design complicated controllers.

As described above, in at least some aspects of Embodiment 1 of the present invention, the present disclosure provides a computational algorithm that can infer the reward/cost function from observed behaviors effectively. The algorithm of the embodiments of the present invention can be implemented in general-purpose computer systems with appropriate hardware and software as well as specifically designed proprietary hardware/software. Various advantages according to at least some embodiments of the present invention include:

A) Model-free method/system: the method and system according to the embodiments of the present invention do not need to know the environmental dynamics in advance; i.e., the method/system is regarded as a model-free method—it is not necessary to model the target dynamics explicitly although some prior art approaches assume that the environmental dynamics is known in advance.

B) Data efficient: the dataset for the method and system according to the embodiments of the present invention consist of a set of state transition while many previous methods require a set of trajectories of states. Thus, in the methods and system according to the embodiments of the present invention it is easier to collect the data.

C) Computationally efficient (1): the method and system according to the embodiments of the present invention do not need to solve a (forward) reinforcement learning problem. In contrast, some previous methods required solving such a forward reinforcement learning problem many times with the estimated reward/cost function. That computation must be performed for each candidate and it usually takes long time to find the optimal solution.

D) Computationally efficient (2): the method and system according to the embodiments of the present invention use two optimization algorithms: (a) density ratio estimation and (b) regularized least squares. In contrast, some previous methods use a stochastic gradient method or a Markov chain Monte Carlo method, which usually take time to optimize as compared with least-squares methods.

Figure 7:
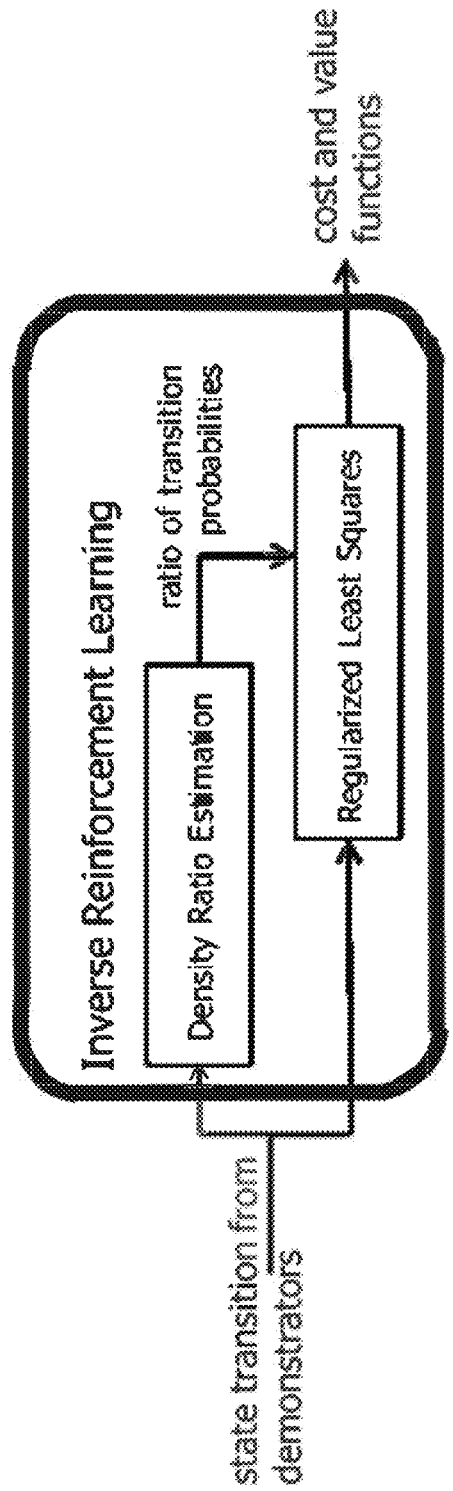
FIG. 7 schematically shows a framework of inverse reinforcement learning according to Embodiment 1 of the present invention that can infer an objective function from observed state transitions generated by demonstrators.

As described above, in one aspect, the present invention provides inverse reinforcement learning that can infer the objective function from observed state transitions generated by demonstrators. FIG. 7 schematically shows a framework of the method according to Embodiment 1 of the present invention. An embodiment of the inverse reinforcement learning according to Embodiment 1 of the present invention includes two components: (1) learning the ratio of state transition probabilities with and without control by density ratio estimation and (2) estimation of the cost and value functions that are compatible with the ratio of transition probabilities by a regularized least squares method. By the use of efficient algorithms for each step, the embodiments of the present invention are more efficient in data and computation than other inverse reinforcement learning methods.

The industrial applicability and usefulness of inverse reinforcement leaning have been well understood and recognized. Examples of the system/configuration to which the embodiments of the present invention can be applied are described below.

<Imitation Learning of Robot Behaviors>

Programming robots to perform complex tasks is difficult with standard methods such as motion planning. In many situations, it is much easier to demonstrate the desired behaviors to the robot. However, a major drawback of classical imitation learning is that the obtained controller cannot cope with new situations because it just reproduces the demonstrated movements. Embodiments of the present invention can estimate the objective function from the demonstrated behaviors and then the estimated objection function can be used for learning different behaviors for different situations.

Figure 8:
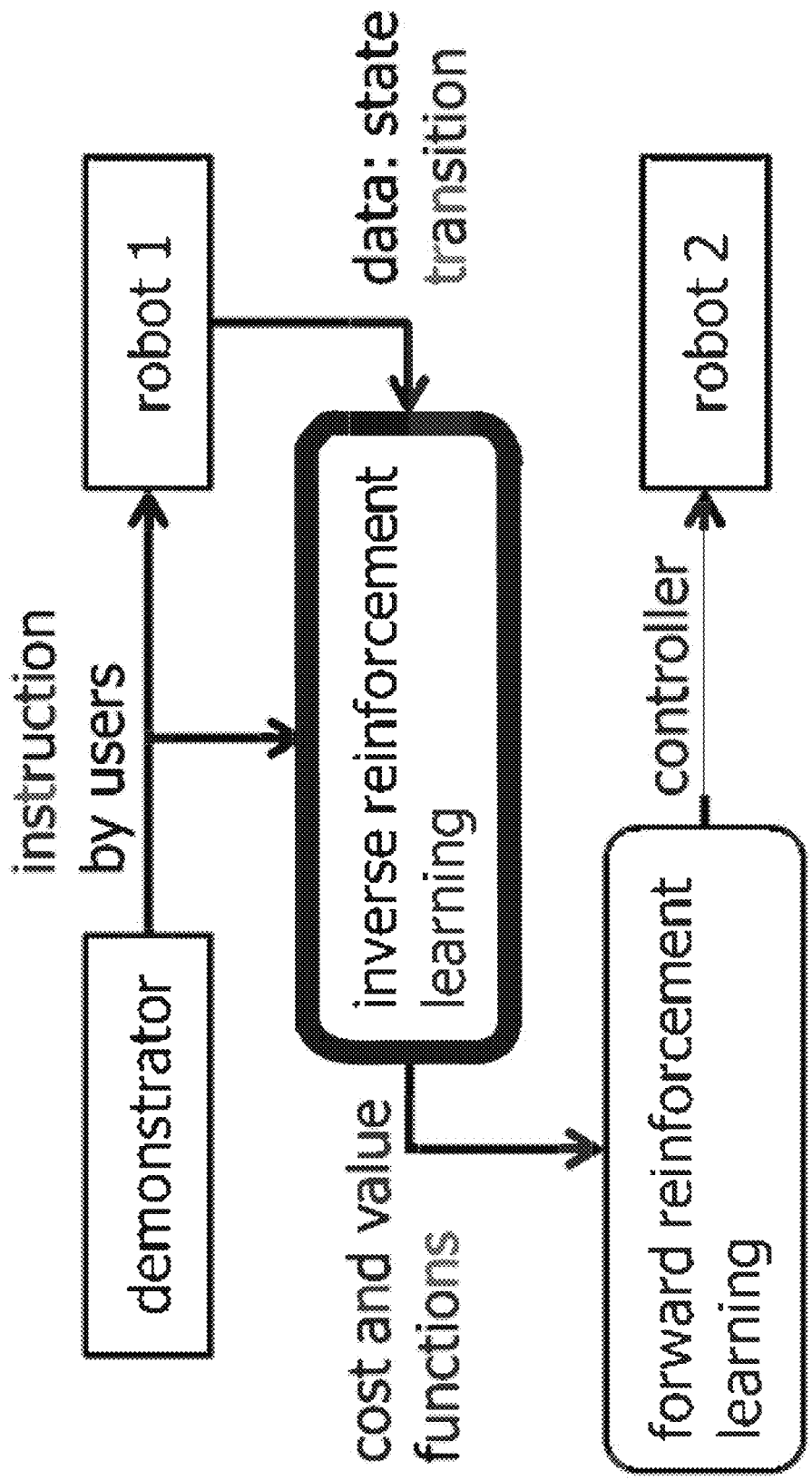
FIG. 8 is a schematic block diagram showing an example of implementation of the inverse reinforcement learning of the present invention in imitation learning of robot behaviors.

FIG. 8 schematically shows such an implementation of the present invention. First, the demonstrator controls a robot to accomplish a task and the sequence of states and actions is recorded. Then an inverse reinforcement learning component according to an embodiment of the present invention estimates the cost and value functions, which are then given to forward reinforcement learning controllers for different robots.

<Interpretation of Human Behaviors>

Figure 9:
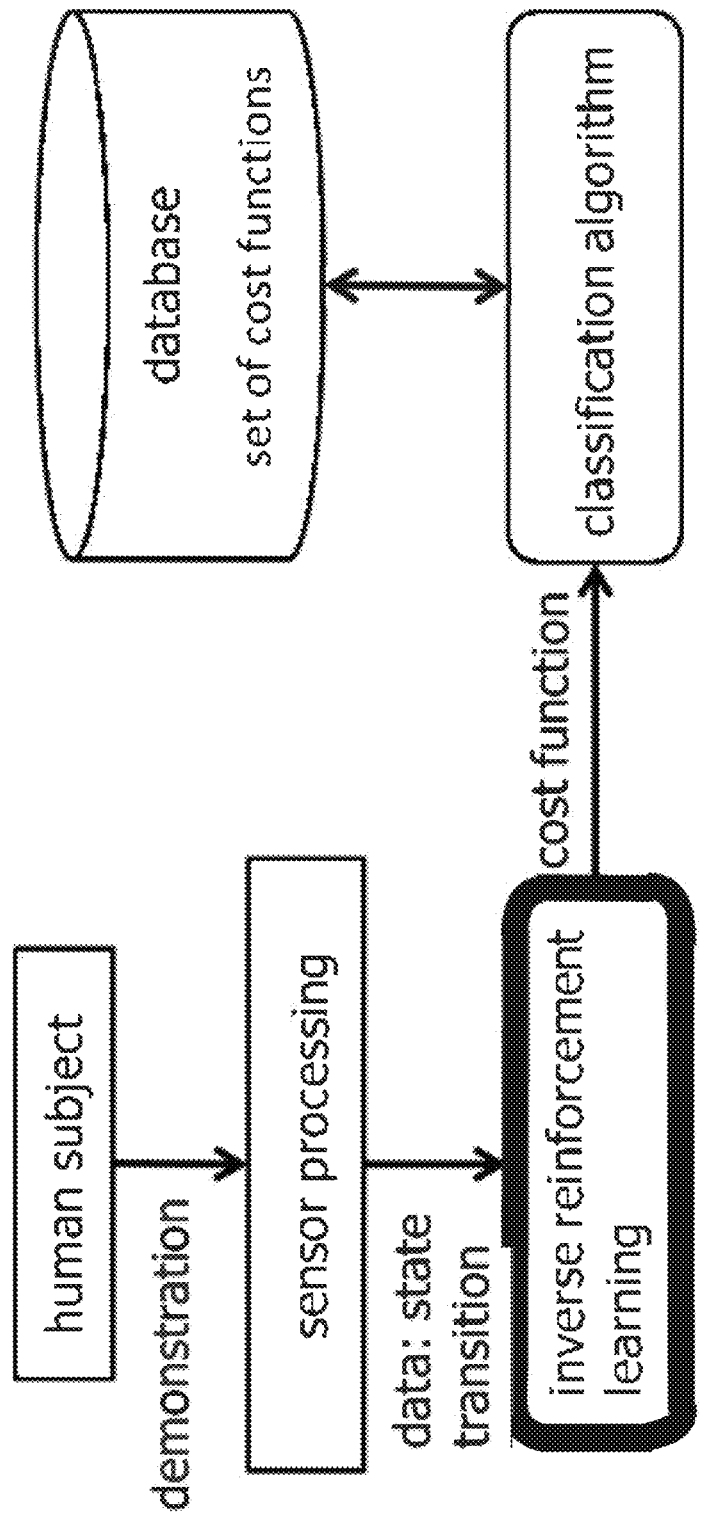
FIG. 9 is a schematic block diagram showing an example of implementation of the inverse reinforcement learning of the present invention in interpreting human behaviors.

Understanding of the human intentions behind behaviors is a basic issue in building a user-friendly support system. In general, a behavior is represented by a sequence of states, which are extracted by the motion tracking system. The cost function estimated by the inverse reinforcement learning method/system according to an embodiment of the present invention can be regarded as a compact representation to explain the given behavioral dataset. Through pattern classification of the estimated cost functions, it becomes possible to estimate the user's expertise or preference. FIG. 9 schematically shows this implementation according to an embodiment of the present invention.

<Analysis of the Web Experience>

Figure 10:
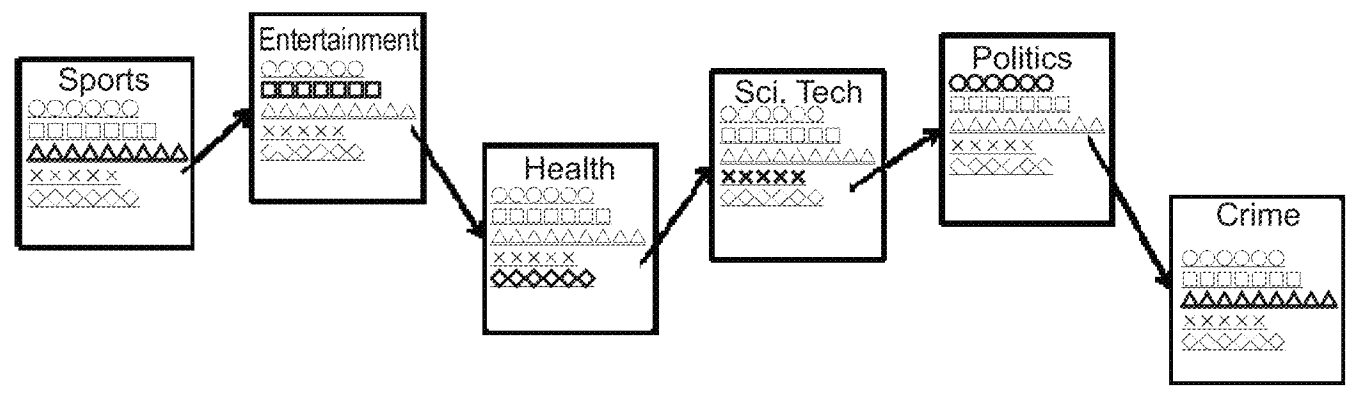

In order to increase the likelihood for visitors to read articles that are presented to the visitors, the designers of online news websites, for example, should investigate the web experiences of visitors from a viewpoint of decision making. In particular, recommendation systems are receiving attention as an important business application for personalized services. However, previous methods such as collaborative filtering do not consider the sequences of decision making explicitly. Embodiments of the present invention can provide a different and effective way to model the behaviors of visitors during net surfing. FIG. 10 shows an example of a series of clicking actions by a user, indicating what topics were accessed in what order by the user. The topic that the visitor is reading is regarded as the state and clicking the link is considered as the action. Then, inverse reinforcement learning according to an embodiment of the present invention can analyze the decision-making in the user's net surfing. Since the estimated cost function represents the preference of the visitor, it becomes possible to recommend a list of articles for the user.

Figure 11:
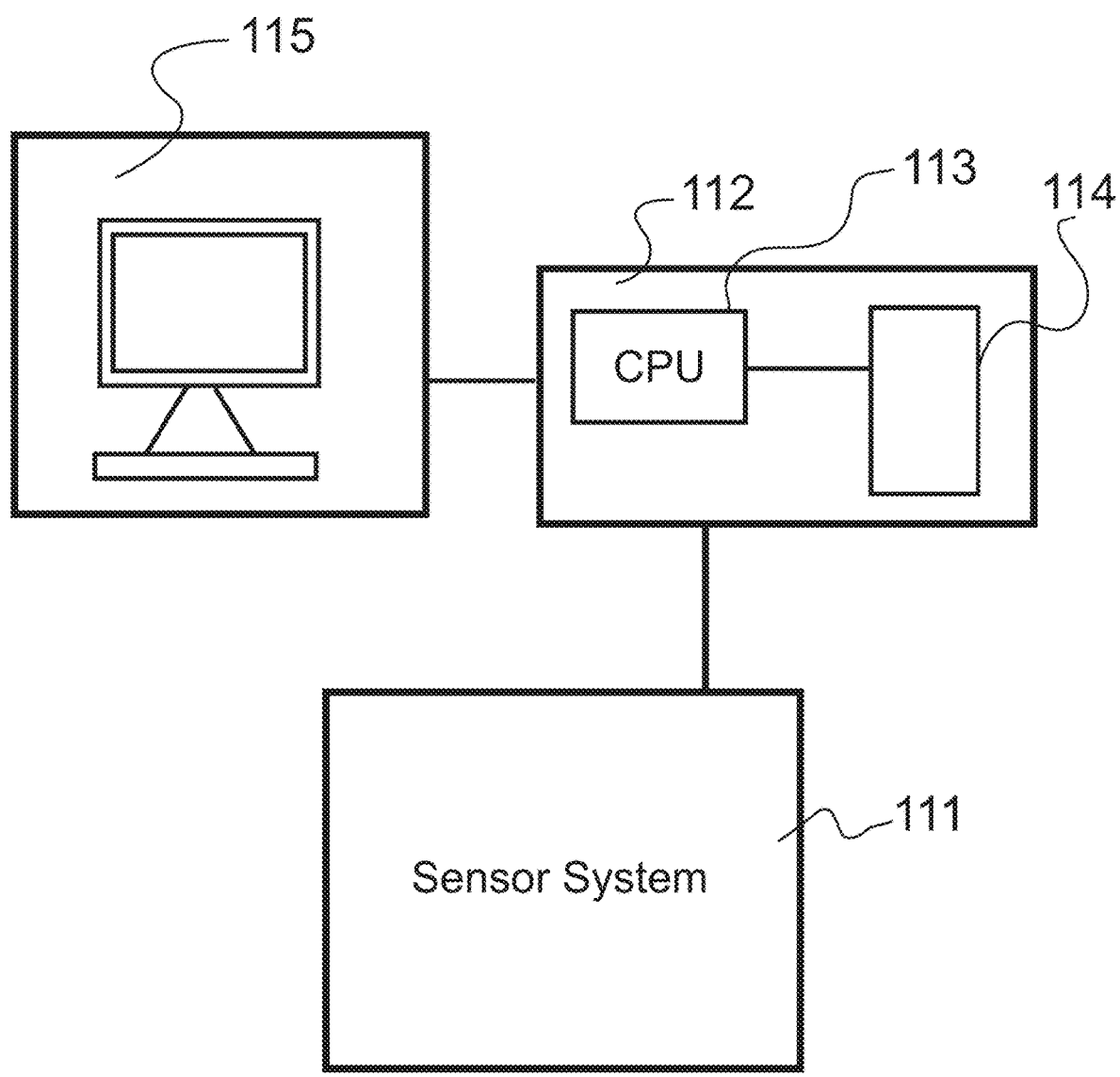
FIG. 11 schematically shows an example of an inverse reinforcement learning system according to an embodiment of the present invention.

As described above, the inverse reinforcement learning schemes according to embodiments in Embodiment 1 of the present invention are applicable to a wide variety of industrial and/or commercial systems. FIG. 11 shows an example of the implementation using a general computer system and a sensor system. The methods explained above with mathematical equations can be implemented in such a general computer system, for example. As shown in the figure, the system of this example includes a sensor system 111 (an example of a data acquisition unit) to receive information about state transitions—i.e., observed behavior—from the object being observed. The sensor system 111 may include one or more of an image capturing device with image processing software/hardware, displacement sensors, velocity sensors, acceleration sensors, microphone, keyboards, and any other input devices. The sensor system 111 is connected to a computer 112 having a processor 113 with an appropriate memory 114 so that the received data can be analyzed according to embodiments of the present invention. The result of the analysis is outputted to any output system 115, such as a display monitor, controllers, drivers, etc. (examples of an output interface), or, an object to be controlled in the case of utilizing the results for control. The result can be used to program or transferred to another system, such as another robot or computer, or website software that responds to user's interaction, as described above.

In the case of predicting the user's web article preference described above, the implemented system may include a system for inverse reinforcement learning as described in any one of the embodiments above, implemented in a computer connected to the Internet. Here, the state variables that define the behaviors of the user include topics of articles selected by the user while browsing each webpage. Then, the result of the inverse reinforcement learning is used to cause an interface through which the user is browsing Internet websites, such as portable smartphone, personal computer, etc., to display a recommended article for the user.

II. Embodiment 2

Figure 12:
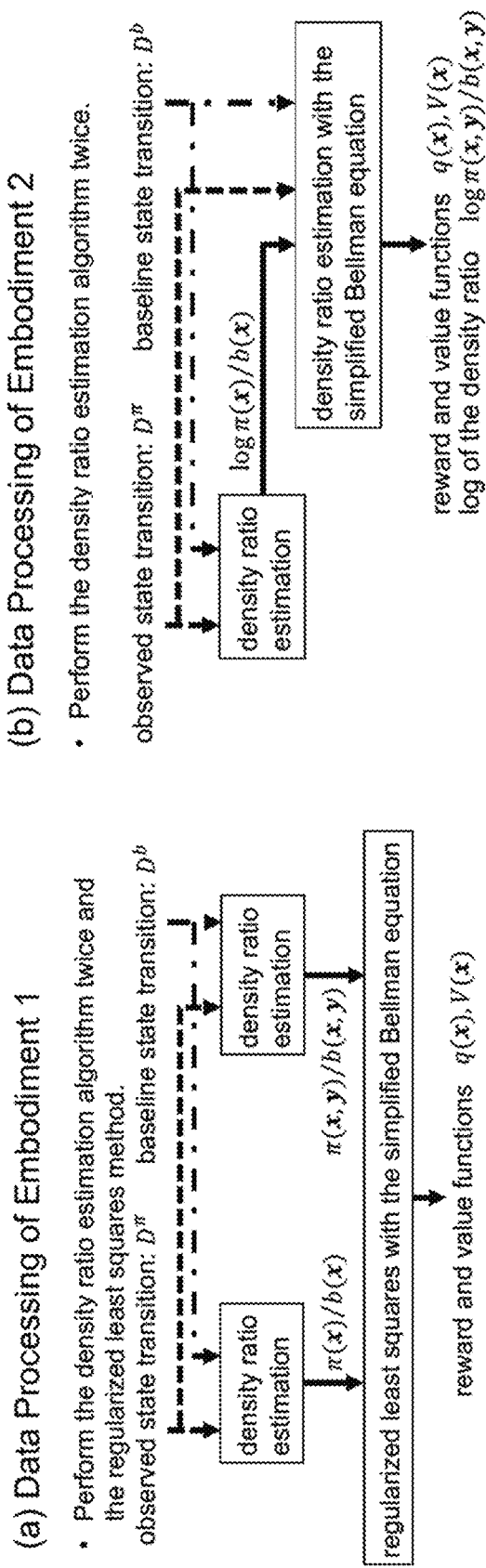
FIG. 12 schematically shows differences between Embodiment 1 and Embodiment 2 of the present invention.

Embodiment 2 that has superior characteristics than Embodiment 1 in some aspects will be described below. FIG. 12 schematically shows differences between Embodiment 1 and Embodiment 2. As described above and shown in (a) in FIG. 12, Embodiment 1 used the density ratio estimation algorithm twice and the regularized least squares method. In contrast, in Embodiment 2 of the present invention, a logarithm of the density ratio $\pi(x)/b(x)$ is estimated using a standard density ratio estimation (DRE) algorithm, and $r(x)$ and $V(x)$, which are a reward function and a value function, respectively, are computed through the estimation of a log of the density ratio $\pi(x,y)/b(x,y)$ with the Bellman equation. In more detail, in Embodiment 1, the following three steps were needed: (1) estimate $\pi(x)/b(x)$ by a standard DRE algorithm; (2) estimate $\pi(x,y)/b(x,y)$ by a standard DRE algorithm, and (3) compute $r(x)$ and $V(x)$ by a regularized least squares method with the Bellman equation. In contrast, Embodiment 2 uses only two-step optimization: (1) estimate $\ln \pi(x)/b(x)$ by a standard density ratio estimation (DRE) algorithm, and (2) compute $r(x)$ and $V(x)$ through a DRE (second time) of $\ln \pi(x,y)/b(x,y)$ with the Bellman equation.

FIG. 13 schematically explains the computational scheme of the second DRE for step (2) in Embodiment 2. As shown in FIG. 13, the second DRE of $\ln \pi(x,y)/b(x,y)$ leads to an estimation of $r(x)+\gamma V(y)-V(x)$ using the following equation because the first DRE estimates $\ln \pi(x)/b(x)$.

$$r(x) + \gamma V(y) - V(x) = \ln \frac{\pi(y \mid x)}{b(y \mid x)}$$

$$= \ln \frac{\pi(x, y)}{b(x, y)} - \ln \frac{\pi(x)}{b(x)}$$

These equations are, in essence, the same as Equation (11) and (15) described above. Thus, in Embodiment 2, there is no need to compute third step (3) of Embodiment 1 by a regularized least squares method, and the computational costs can be significantly reduced as compared with Embodiment 1. In Embodiment 2, in order to execute the second step (2) of computing r(x) and V(x) through a DRE (second time) of ln π(x,y)/b(x,y) with the Bellman equation, the basis functions are designed in the state space, which reduces the number of parameters to be optimized. In contrast, in Embodiment 1, in step (2) of estimating π(x,y)/b(x,y) by a standard DRE algorithm, the basis functions need to be designed in the product of the state spaces, which requires relatively a large number of parameters to be optimized. Thus, Embodiment 2 requires a relatively low memory usage as compared with Embodiment 1. Thus, Embodiment 2 has these various significant advantages over Embodiment 1. Other features and setups of Embodiment 2 are same as various methodologies and schemes described above for Embodiment 1 unless otherwise specifically explained below.

Table 1 below shows general comparison of Embodiment 2 versus various conventional methods. Specifically, various features are compared for Embodiment 2 with respect to the above-described OptV, maximum entropy IRL (MaxEnt-IRL), and relative entropy IPL (RelEnt-IRL). As shown in Table 1, Embodiment 1 of the present invention has various advantages over the conventional methods.

TABLE 1

|  | Embodiment 2 | OptV | MaxEnt | RelEnt |
|---|---|---|---|---|
| model-free? | Yes | No | No | Yes |
| data | state transition |  | trajectory |  |
| forward RL? | No | No | Yes | No |
| partition function? | No | Yes | Yes | partially yes |

Figure 14:
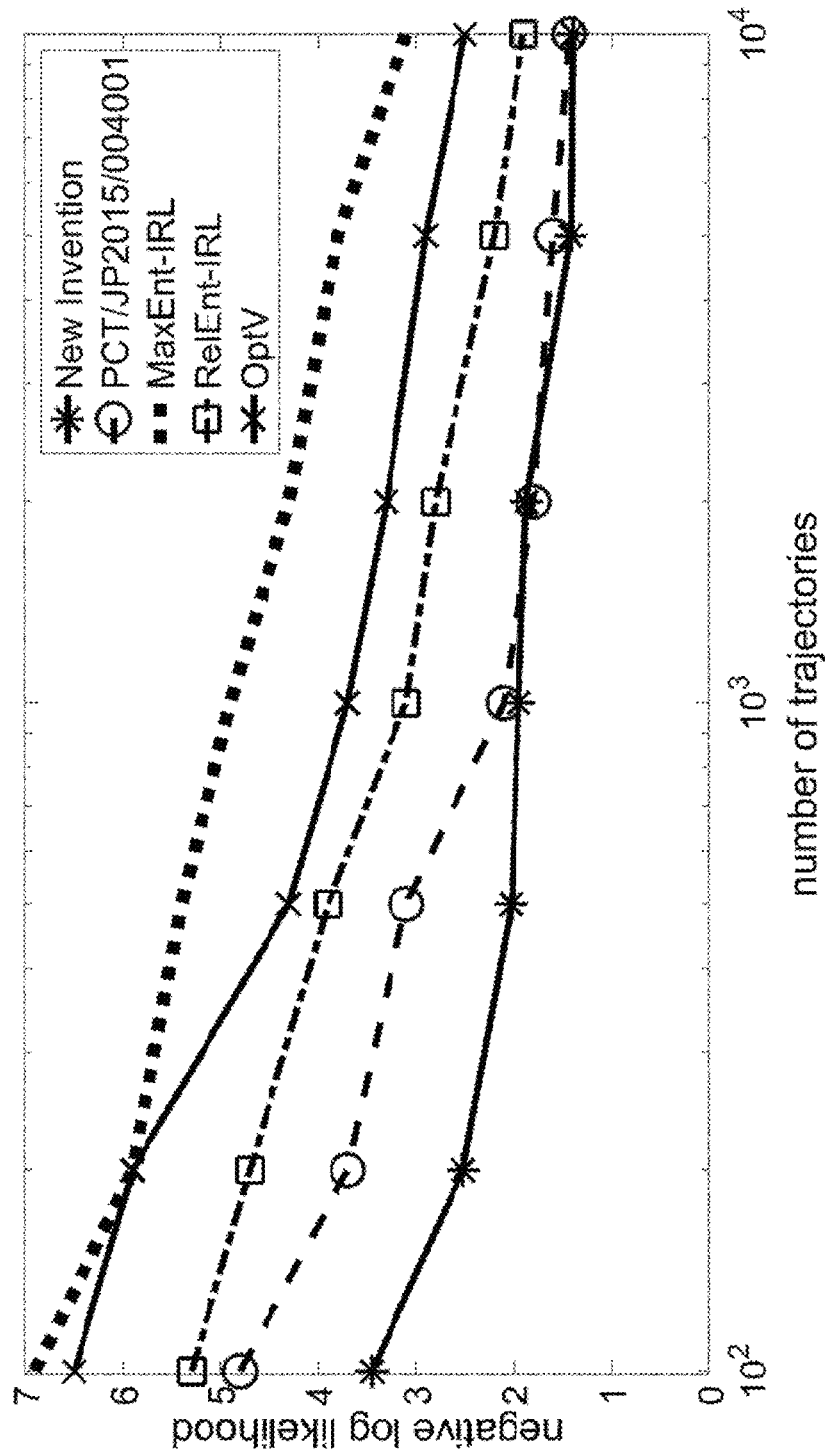
FIG. 14 shows the experimental results of the swing-up inverted pendulum problem comparing Embodiment 2 with Embodiment 1 and other methods.

To demonstrate and confirm the effectiveness of Embodiment 2 of the present invention, the above-described swing-up inverted pendulum problem was studied. FIG. 14 shows the results of the experiment comparing Embodiment 2 with Embodiment 1, MaxEnt-IRL, RelEnt-IRL and OptV. Embodiment 2 is indicated as "New Invention" and Embodiment 1 is indicated as "PCT/JP2015/004001" in the figure. As shown in FIG. 14, Embodiment 2 has successfully recovered observed policies better than other methods, including Embodiment 1, even though the number of samples are small.

<Robot Navigation Task Experiment>

Figure 15:
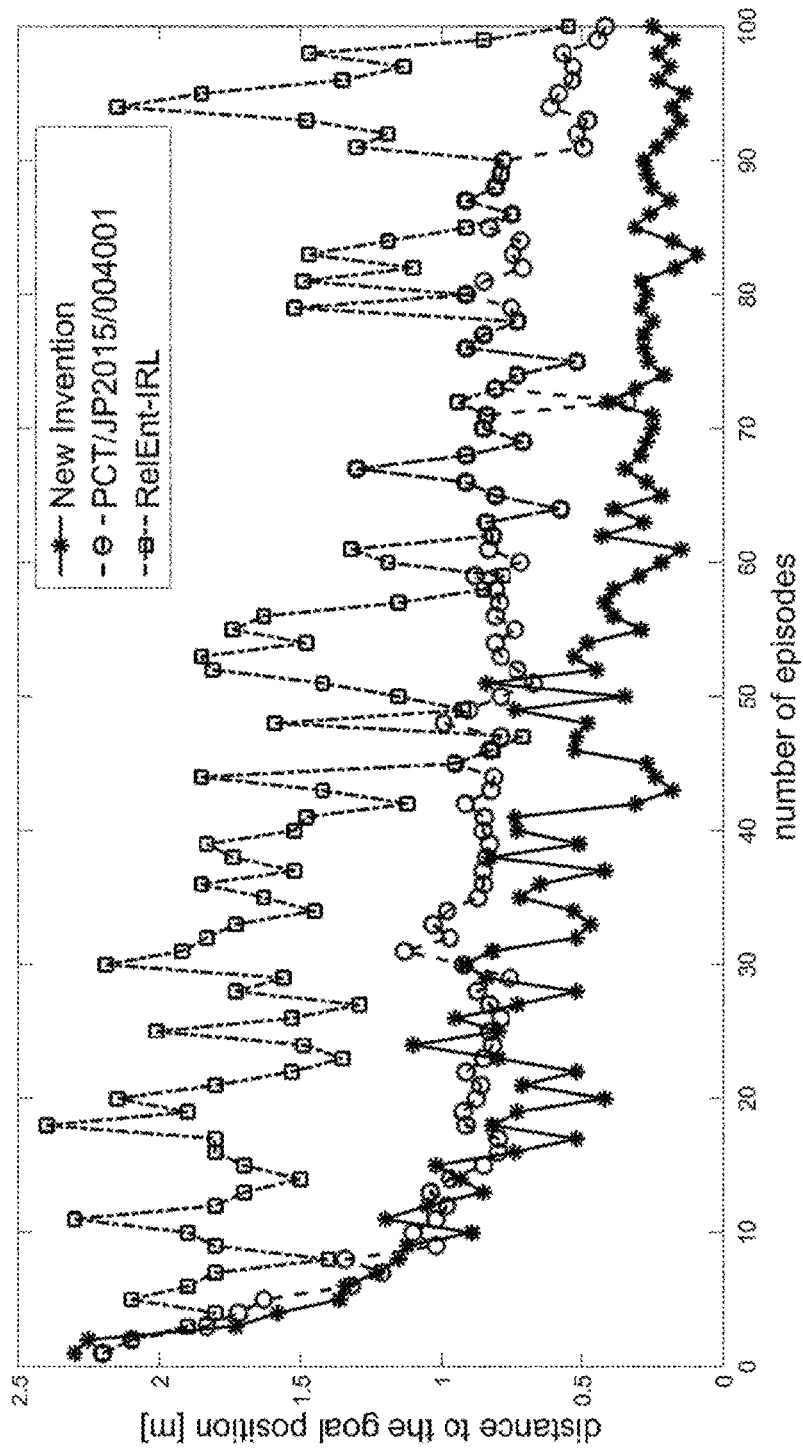
FIG. 15 shows the experimental results of the robot navigation task using Embodiments 1 and 2 and RelEnt-IRL.

To further demonstrate and confirm the effectiveness of Embodiment 2 of the present invention, a robot navigation task was studied for Embodiment 2, Embodiment 1, and RelEt-IRL. Three target objects of red (r), green (g), and blue (b) were placed in front of a programmable robot with camera eyes. The goal was to reach the green (g) target among the three targets. Five predetermined starting positions A-E were lined up in front of the three targets. Training data were collected from the starting positions A-C and E, and test data was taken using the starting position D. The state vector was as follows: $x=[\theta_r, N_r, \theta_g, N_g, \theta_b, N_b, \theta_{pan}, \theta_{tilt}]^T$ where $\theta_i$ (i=r, g, b) is the angle to the target, $N_i$ (i=r, g, b) is the blob size, $\theta_{pan}$ and $\theta_{tilt}$ are the angles of the camera of the robot. The basis function for V(x) was given as follows:

$$\psi_{V,j}(x) = \exp\left(-\frac{\|x - c_i\|^2}{2\sigma^2}\right),$$

where $c_i$ is the center position selected from the data set. The basis function for r(x) is given as:

$$\psi_q(x) = [f_g(\theta_r), f_s(N_r), f_g(\theta_g), f_s(N_g), f_g(\theta_b), f_s(N_b)]^T,$$

where $f_g$ is Gaussian function, and $f_s$ is sigmoid function. In this experiment, π and b were given by experimenters, and for every starting point, 10 trajectories were collected to create the datasets. FIG. 15 shows the results of the experiment. In the figure, Embodiment 2 is indicated as "New Invention," and Embodiment 1 is indicated as "PCT/JP2015/004001." The results are compared with the result of RelEnt-IRL, described above. As shown in FIG. 15, Embodiment 2 yielded a significantly better result. This also indicates that the estimated value function according to Embodiment 2 may be used as a potential function for shaping rewards.

Computing times (in minutes) in the inverted pendulum task discussed above were evaluated. LogReg IRL and KLIEP IRL in Embodiment 2 required only about 2.5 minutes in the calculation. uLSIF IRL, LSCDE IRL, and LogReg IRL in Embodiment 1 required about 4 minutes to 9.5 minutes, respectively. Thus, Embodiment 2 required significantly less computing times than various versions of Embodiment 1, which are discussed above.

As readily understandable, applications of Embodiment 2 are essentially the same as various applications for Embodiment 1 discussed above. In particular, as discussed above, various versions of Embodiment 2 will be applicable to, among other things: interpretation of human behaviors, analysis of the web experience, and design of robot controllers by imitation in which by showing some ideal behaviors, the corresponding objective function is estimated as an immediate reward. A robot can use the estimated reward with forward reinforcement learning to generalize behaviors for unexperienced situations. Thus, highly economical and reliable systems and methodology can be constructed in accordance with Embodiment 2 of the preset invention. In particular, as described above, Embodiment 2 can recover observed policies with a small number of observations better than other methods. This is a significant advantage.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A method of inverse reinforcement learning for estimating reward and value functions of behaviors of a subject, comprising:
   acquiring data representing changes in state variables that define the behaviors of the subject;

applying a modified Bellman equation given by Eq. (1) to the acquired data:

$$r(x) + \gamma V(y) - V(x) = \ln\frac{\pi(y\mid x)}{b(y\mid x)}, \quad (1)$$

$$= \ln\frac{\pi(x,y)}{b(x,y)} - \ln\frac{\pi(x)}{b(x)}, \quad (2)$$

where r(x) and V(x) denote a reward function and a value function, respectively, at state x, V(y) denotes a value function at state y, γ represents a discount factor, and b(y|x) and π(y|x) denote state transition probabilities before and after learning, respectively, and π(x,y) and b(x,y) denote joint state probabilities before and after learning, respectively;

estimating a logarithm of the density ratio $$\frac{\pi(x)}{b(x)}$$

in Eq. (2);

estimating r(x) and V(x) in Eq. (2) from the result of estimating a log of the density ratio $$\frac{\pi(x,y)}{b(x,y)};$$

and outputting the estimated r(x) and V(x), wherein the method of inverse reinforcement learning predicts a preference in topic of articles that a user is likely to read from a series of articles the user selected in an Internet web surfing, and wherein said subject is the user, and said state variables that define the behaviors of the subject include topics of articles selected by the user while browsing each webpage.

2. The method according to claim 1, wherein the step of estimating the logarithm of the density ratios $$\frac{\pi(x)}{b(x)} \text{ and } \frac{\pi(x,y)}{b(x,y)}$$

includes using Kullback-Leibler Importance Estimation Procedure (KLIEP) with a log-linear model.

3. The method according to claim 1, wherein the step of estimating the logarithm of the density ratios $$\frac{\pi(x)}{b(x)} \text{ and } \frac{\pi(x,y)}{b(x,y)}$$

includes using a logistic regression.

4. A non-transitory storage medium storing instructions to cause a processor to perform an algorithm for inverse reinforcement learning for estimating cost and value functions of behaviors of a subject, said instructions causing the processor to perform the following steps:

acquiring data representing changes in state variables that define the behaviors of the subject;

applying a modified Bellman equation given by Eq. (1) to the acquired data:

$$r(x) + \gamma V(y) - V(x) = \ln\frac{\pi(y\mid x)}{b(y\mid x)}, \quad (1)$$

$$= \ln\frac{\pi(x,y)}{b(x,y)} - \ln\frac{\pi(x)}{b(x)}, \quad (2)$$

where r(x) and V(x) denote a reward function and a value function, respectively, at state x, V(y) denotes a value function at state y, γ represents a discount factor, and b(y|x) and π(y|x) denote state transition probabilities before and after learning, respectively, and π(x,y) and b(x,y) denote joint state probabilities before and after learning, respectively;

estimating a logarithm of the density ratio $$\frac{\pi(x)}{b(x)}$$

in Eq. (2);

estimating r(x) and V(x) in Eq. (2) from the result of estimating a log of the density ratio $$\frac{\pi(x,y)}{b(x,y)};$$

and outputting the estimated r(x) and V(x), wherein the algorithm for inverse reinforcement learning predicts a preference in topic of articles that a user is likely to read from a series of articles the user selected in an Internet web surfing, and wherein said subject is the user, and said state variables that define the behaviors of the subject include topics of articles selected by the user while browsing each webpage.

5. A system for inverse reinforcement learning for estimating cost and value functions of behaviors of a subject, comprising:

a data acquisition unit to acquire data representing changes in state variables that define the behaviors of the subject;

a processor with a memory, the processor and the memory are configured to:

applying a modified Bellman equation given by Eq. (1) to the acquired data:

$$r(x) + \gamma V(y) - V(x) = \ln\frac{\pi(y\mid x)}{b(y\mid x)}, \quad (1)$$

$$= \ln\frac{\pi(x,y)}{b(x,y)} - \ln\frac{\pi(x)}{b(x)}, \quad (2)$$

where r(x) and V(x) denote a reward function and a value function, respectively, at state x, V(y) denotes a value function at state y, γ represents a discount factor, and b(y|x) and π(y|x) denote state transition probabilities before and after learning, respectively, and π(x,y) and b(x,y) denote joint state probabilities before and after learning, respectively;

estimating a logarithm of the density ratio $$\frac{\pi(x)}{b(x)}$$

in Eq. (2);
estimating r(x) and V(x) in Eq. (2) from the result of estimating a log of the density ratio $$\frac{\pi(x, y)}{b(x, y)};$$

and
an output interface that outputs the estimated r(x) and V(x),
wherein the system for inverse reinforcement learning predicts a preference in topic of articles that a user is likely to read from a series of articles the user selected in an Internet web surfing, and
wherein said subject is the user, and said state variables that define the behaviors of the subject include topics of articles selected by the user while browsing each webpage.

6. A system comprising:
the system for inverse reinforcement learning as set forth in claim 5, implemented in a computer connected to the Internet,
wherein the processor causes an interface through which the user is browsing Internet websites to display a recommended article for the user to read in accordance with the estimated cost and value functions.

7. A method for programming a robot to perform complex tasks, comprising:
controlling a first robot to accomplish a task so as to record a sequence of states and actions;
estimating reward and value functions using a system for inverse reinforcement learning based on the recorded sequence of the states and actions; and
providing the estimated reward and value functions to a forward reinforcement leaning controller of a second robot to program the second robot with the estimated reward and value functions,
wherein the system for inverse reinforcement learning for estimating cost and value functions of behaviors of a subject, comprising:
a data acquisition unit to acquire data representing changes in state variables that define the behaviors of the subject;
a processor with a memory, the processor and the memory are configured to:
applying a modified Bellman equation given by Eq. (1) to the acquired data:

$$r(x) + \gamma V(y) - V(x) = \ln\frac{\pi(y \mid x)}{b(y \mid x)}, \quad (1)$$

$$= \ln\frac{\pi(x, y)}{b(x, y)} - \ln\frac{\pi(x)}{b(x)}, \quad (2)$$

where r(x) and V(x) denote a reward function and a value function, respectively, at state x, V(y) denotes a value function at state y, γ represents a discount factor, and b(y|x) and π(y|x) denote state transition probabilities before and after learning, respectively, and π(x,y) and b(x,y) denote joint state probabilities before and after learning, respectively;
estimating a logarithm of the density ratio $$\frac{\pi(x)}{b(x)}$$

in Eq. (2);
estimating r(x) and V(x) in Eq. (2) from the result of estimating a log of the density ratio $$\frac{\pi(x, y)}{b(x, y)};$$

and
an output interface that outputs the estimated r(x) and V(x).

* * * * *